US012232134B2

(12) United States Patent
Wu et al.

(10) Patent No.: US 12,232,134 B2
(45) Date of Patent: Feb. 18, 2025

(54) METHODS FOR UPLINK AND DOWNLINK TRANSMISSION/RECEPTION WITHOUT GRANT AND APPARATUS THEREFOR

(71) Applicant: Samsung Electronics Co., Ltd., Suwon-si (KR)

(72) Inventors: Min Wu, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/711,976

(22) Filed: Apr. 1, 2022

(65) Prior Publication Data

US 2022/0322415 A1  Oct. 6, 2022

(30) Foreign Application Priority Data

Apr. 2, 2021 (CN) .................... 202110362067.X
Aug. 4, 2021 (CN) .................... 202110893370.2

(51) Int. Cl.
*H04W 72/23* (2023.01)
*H04W 52/34* (2009.01)

(52) U.S. Cl.
CPC ......... *H04W 72/23* (2023.01); *H04W 52/346* (2013.01)

(58) Field of Classification Search
CPC .............. H04W 72/23; H04W 52/346
See application file for complete search history.

(56) References Cited

U.S. PATENT DOCUMENTS

| 2019/0082454 | A1 | 3/2019 | Shi et al. |
| 2019/0159139 | A1* | 5/2019 | Yamada ............... H04W 52/365 |
| 2019/0342944 | A1 | 11/2019 | Chatterjee et al. |
| 2020/0178228 | A1* | 6/2020 | Li .......................... H04W 68/02 |
| 2024/0196397 | A1* | 6/2024 | Awad ................ H04W 72/1268 |

OTHER PUBLICATIONS

Lucas-Estan, On the Capacity of 5G NR Grant-Free Scheduling with Shared Radio Resources to Support Ultra-Reliable and Low-Latency Communications, 2019 (Year: 2019).*
Vivo, "Challenges and potential enhancements of XR", 3GPP TSG RAN WG1 #104-e, Jan. 25-Feb. 5, 2021, R1-2100479, 6 pages.
Catt, "Potential area of NR enhancement for the support of XR services", 3GPP TSG RAN WG1 #104-e, Jan. 25-Feb. 5, 2021, R1-2100364, 4 pages.

(Continued)

*Primary Examiner* — Ricky Q Ngo
*Assistant Examiner* — Stephen N Steiner

(57) ABSTRACT

The present disclosure provides a method performed by user equipment, comprising: receiving configuration information of scheduling without grant for uplink or downlink; performing a transmission of the scheduling without grant based on the configuration information of scheduling without grant, wherein the configuration information of scheduling without grant comprises first information and/or second information, wherein the first information is used for indicating related information of multiple different transport block sizes and the second information is used for indicating related information of multiple different starting time domain positions.

20 Claims, 19 Drawing Sheets

(56) References Cited

OTHER PUBLICATIONS

Apple Inc., "Views on potential enhancements for XR", 3GPP TSG-RAN WG1 Meeting #104-e, Jan. 25-Feb. 5, 2021, R1-2101367, 4 pages.
International Search Report dated Jul. 22, 2022 in connection with International Patent Application No. PCT/KR2022/004751, 3 pages.
Written Opinion of the International Searching Authority dated Jul. 22, 2022 in connection with International Patent Application No. PCT/KR2022/004751, 3 pages.

* cited by examiner

S510: A BASE STATION TRANSMITS CONFIGURATION INFORMATION OF SCHEDULING WITHOUT GRANT FOR UPLINK OR DOWNLINK TO USER EQUIPMENT, WHEREIN THE CONFIGURATION INFORMATION OF THE SCHEDULING WITHOUT GRANT INCLUDES FIRST INFORMATION AND/OR SECOND INFORMATION, WHEREIN THE FIRST INFORMATION IS USED FOR INDICATING RELATED INFORMATION OF MULTIPLE DIFFERENT TRANSPORT BLOCK SIZES AND THE SECOND INFORMATION IS USED FOR INDICATING RELATED INFORMATION OF MULTIPLE DIFFERENT STARTING TIME DOMAIN POSITIONS

FIG.12

METHODS FOR UPLINK AND DOWNLINK TRANSMISSION/RECEPTION WITHOUT GRANT AND APPARATUS THEREFOR

CROSS-REFERENCE TO RELATED APPLICATIONS

This application is based on and claims priority under 35 U.S.C. § 119 to Chinese Patent Application No. 202110362067.X, filed Apr. 2, 2021, and Chinese Patent Application No. 202110893370.2, filed Aug. 4, 2021, in the Chinese Intellectual Property Office, the disclosures of which are incorporated by reference herein in their entirety.

BACKGROUND

1. Field

The present disclosure relates to the technical field of wireless communication, in particular to a method performed by user equipment, a method performed by a base station, user equipment and a base station.

2. Description of Related Art

In order to meet the increasing demand for wireless data communication services since the deployment of $4^{th}$ generation (4G) communication systems, efforts have been made to develop improved $4^{th}$ generation (5G) or pre-5G communication systems. Therefore, 5G or pre-5G communication systems are also called "Beyond 4G networks" or "Post-LTE systems."

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superlocation coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

According to an aspect of the present disclosure, there is provided a method performed by user equipment, comprising: receiving configuration information of scheduling without grant for uplink or downlink; performing transmission of the scheduling without grant based on the configuration information of the scheduling without grant, wherein the configuration information of scheduling without grant includes first information and/or second information, wherein the first information is used for indicating related information of multiple different transport block sizes and the second information is used for indicating related information of multiple different starting time domain positions.

According to an aspect of the present disclosure, there is provided a method performed by a base station, comprising: transmitting configuration information of scheduling without grant for uplink or downlink by the base station to user equipment, wherein the configuration information of the scheduling without grant includes first information and/or second information, wherein the first information is used for indicating related information of multiple different transport block sizes and the second information is used for indicating related information of multiple different starting time domain positions.

According to an aspect of the present disclosure, there is provided user equipment, the user equipment comprises: a transceiver configured to transmit and receive signals with the outside; and a processor configured to control the transceiver to perform a method according to the method performed by the user equipment UE.

According to an aspect of the present disclosure, there is provided a base station, the base station comprises: a transceiver configured to transmit and receive signals with the outside; and a processor configured to control the transceiver to perform the above methods performed by the base station.

According to an aspect of the present disclosure, there is provided a non-transitory computer-readable recording medium having stored thereon a program, which when performed by a computer, performs any one of the methods described above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION

For a more complete understanding of the present disclosure and its advantages, reference is now made to the following description taken in conjunction with the accompanying drawings, in which like reference numerals represent like parts:

FIG. 12 illustrates a flowchart of a method performed by a base station according to an embodiment of the present disclosure;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
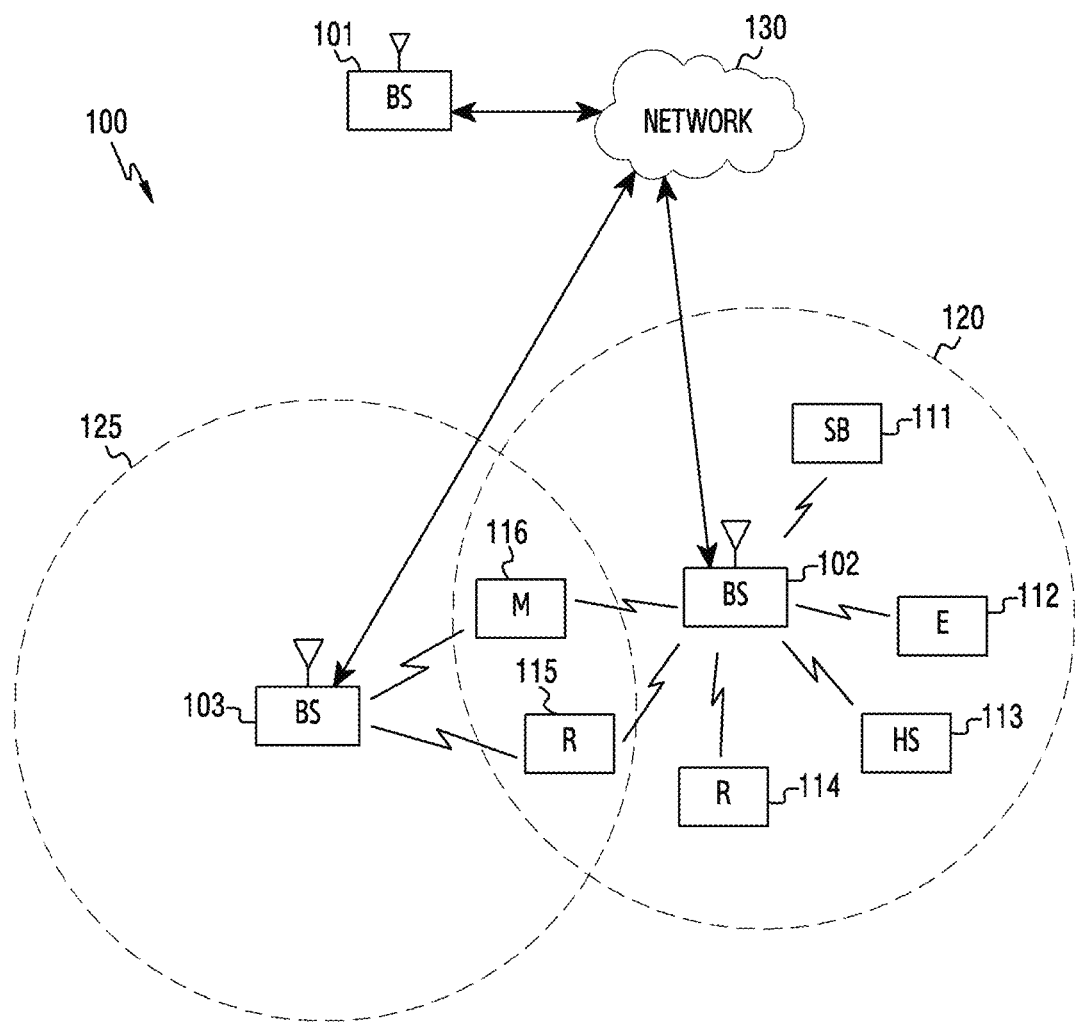
FIG. 1 illustrates an exemplary wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of user equipments (UEs) within a coverage area 120 of the gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. A gNB 103 provides wireless broadband access to network 130 for a second plurality of UEs within a coverage area 125 of the gNB 103. The second plurality of UEs include the UE 115 and the UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the gNB 101, the gNB 102, and the gNB 103 include a 2D antenna array as described in embodiments of the present disclosure. In some embodiments, one or more of the gNB 101, the gNB 102, and the gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
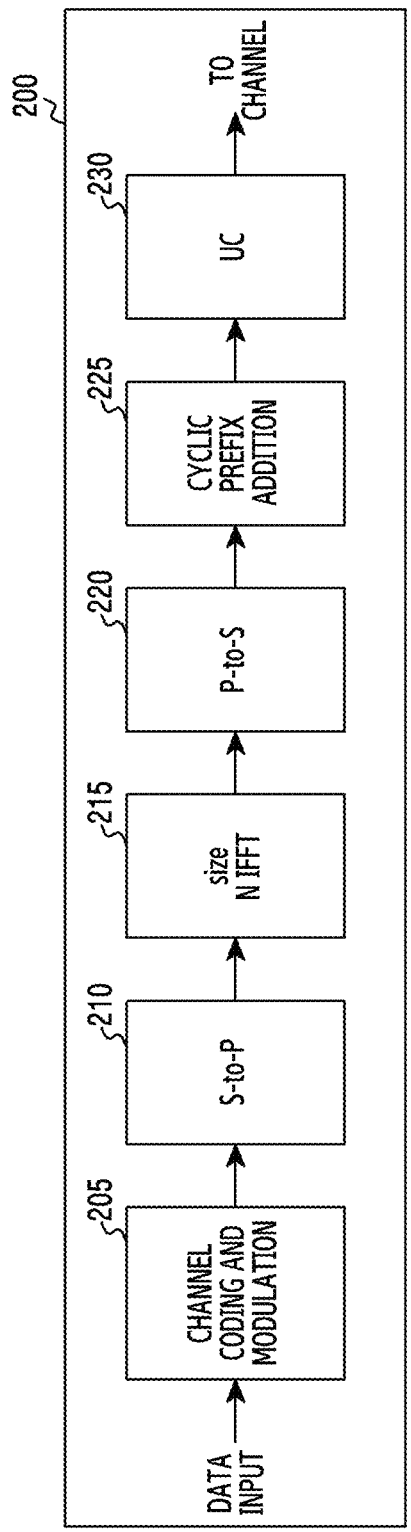
FIGS. 2A and 2B illustrate example wireless transmission and reception paths according to various embodiments of the present disclosure.
Figure 2B:
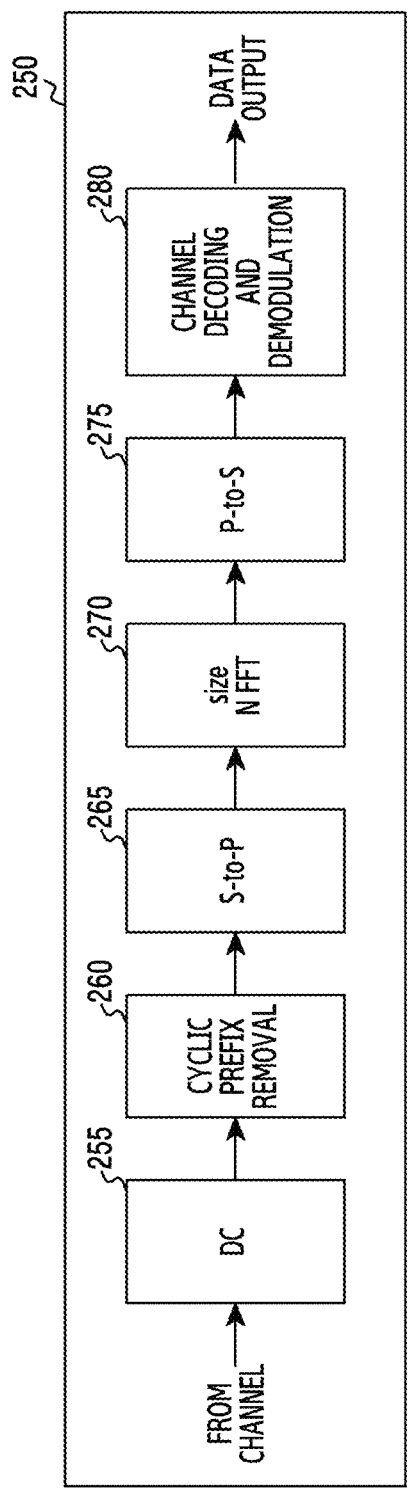

FIGS. 2A and 2B illustrate example wireless transmission and reception paths according to the present disclosure. In the following description, the transmission path 200 can be described as being implemented in a gNB, such as the gNB 102, and the reception path 250 can be described as being implemented in UE, such as the UE 116. However, it should be understood that the reception path 250 can be implemented in a gNB and the transmission path 200 can be implemented in UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The parallel-to-serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The Size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
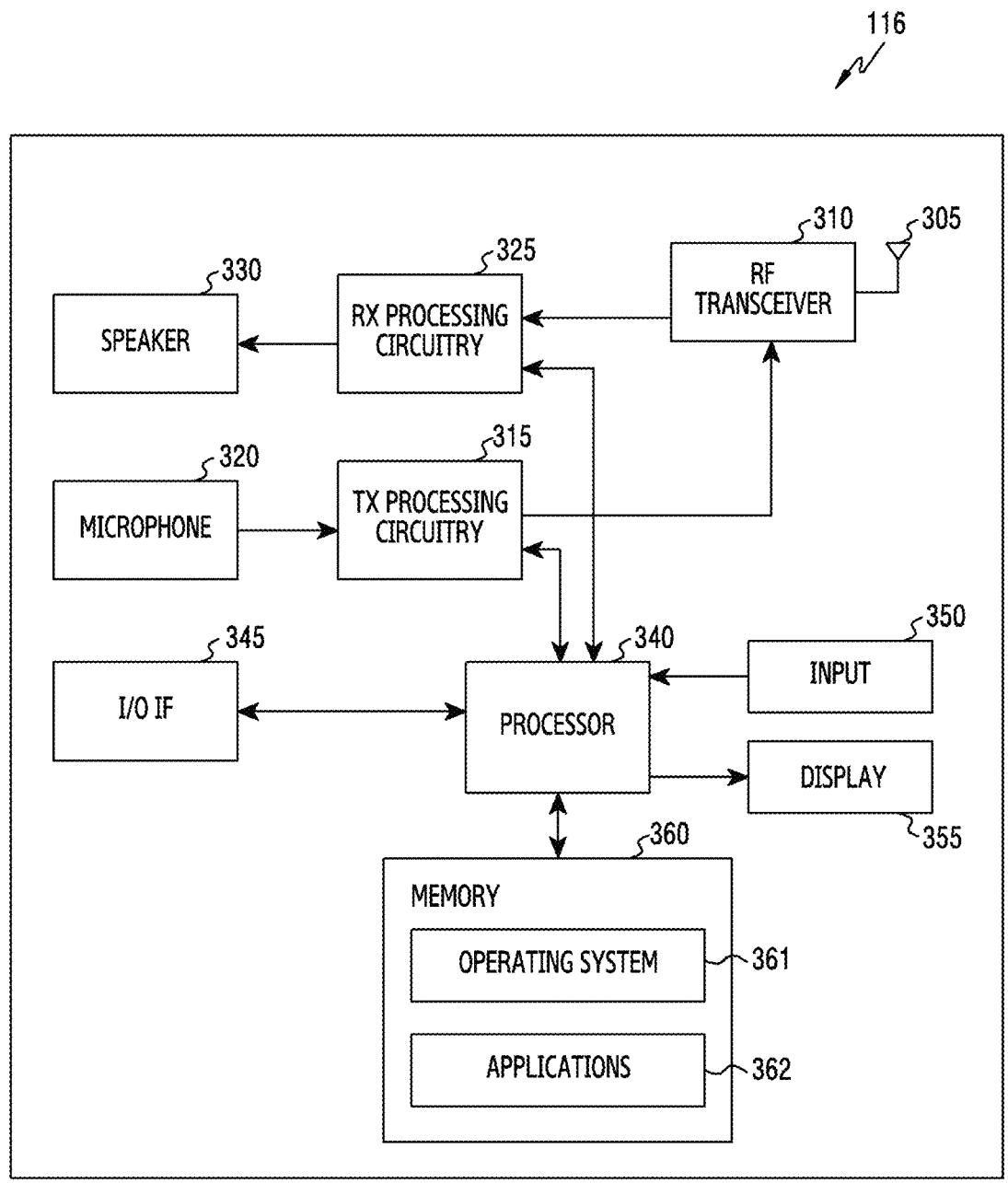
FIG. 3A illustrates an example user equipment UE according to various embodiments of the present disclosure.

FIG. 3A illustrates an example UE 116 according to the present disclosure. The embodiment of the UE 116 shown in FIG. 3A is for illustration only, and UEs 111-115 of FIG. 1 can have the same or similar configuration. However, the UE has various configurations, and FIG. 3A does not limit the scope of the present disclosure to any specific implementation of the UE.

The UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of the UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
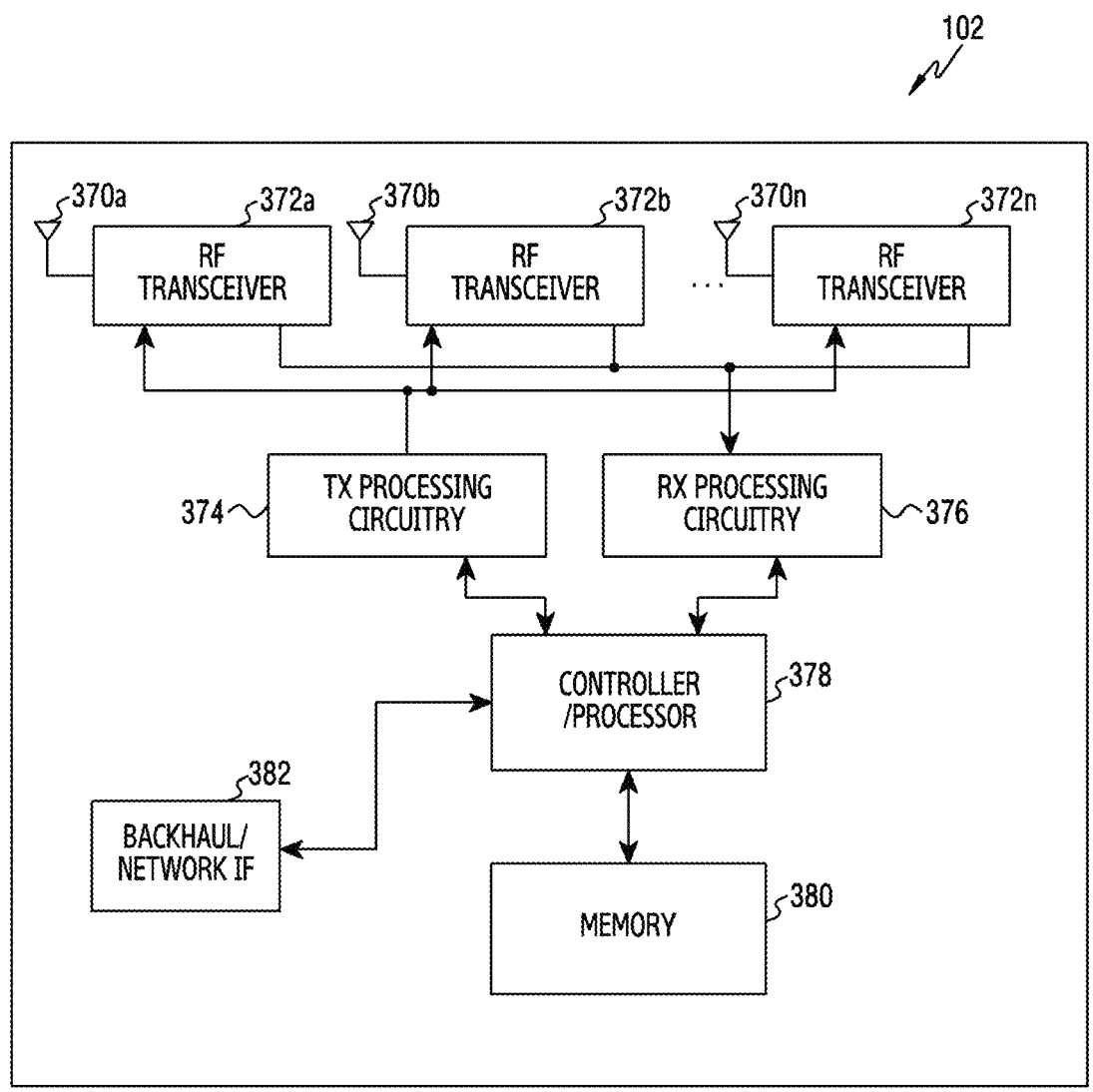
FIG. 3B illustrates an example base station gNB 102 according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that the gNB 101 and the gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372*a*-372*n*, TX processing circuit 374 and/or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In the existing LTE system and NR system, in order to save the overhead of scheduling signaling and reduce the delay of data scheduling, both the uplink and downlink support scheduling without grant, that is, for each physical downlink data channel (PDSCH) or physical uplink data channel (PUSCH), the user equipment (UE) does not need to receive the corresponding dynamic scheduling information. Instead, the UE receives PDSCH or transmits PUSCH based on pre-stored configuration information of scheduling without grant, which can be used for periodic uplink transmission or downlink transmission, in other words, the UE periodically receives PDSCH or transmits PUSCH on the same physical resources.

In LTE system, this kind of scheduling without grant is also called semi-persistent scheduling, such as SPS-PDSCH and SPS-PUSCH. In semi-persistent scheduling, the configuration information of scheduling without grant pre-stored at the UE side can be configured or reconfigured by activating DCI transmitted by SPS, and the configuration information of scheduling without grant pre-stored at the UE side can be cleared by deactivating DCI transmitted by SPS.

In NR system, scheduling without grant for downlink is similar to that in LTE system, that is, the scheduling without grant for downlink also supports SPS-PDSCH; the scheduling without grant for uplink is slightly different from that in LTE system, and the scheduling supports two types. For type 1 scheduling without grant, configuration information of scheduling without grant pre-stored at the UE side is configured by RRC signaling, that is, indicated by configuration information of scheduling without grant together. For type 2 scheduling without grant, the type 2 scheduling is essentially the same as SPS-PUSCH of LTE system, in which the configuration information of scheduling without grant pre-stored at the UE side can be configured or reconfigured by activating DCI of scheduling without grant, and the configuration information of scheduling without grant pre-stored at the UE side can be cleared by deactivating DCI of scheduling without grant. The scheduling without grant for uplink in NR system is also called scheduling with configured grant, that is, the configuration information of scheduling without grant is pre-configured. The scheduling without grant for downlink in NR system is also called semi-persistent scheduling.

The existing technology for scheduling without grant can effectively save scheduling signaling overhead and reduce scheduling delay, but it needs to be enhanced for new service requirements. For example, for extended reality (XR) services, including enhanced services for various realities such as augmented reality (AR), virtual reality (VR), mixed reality (MR), cinematic reality (CR), etc., it is necessary to support multiple video streams with different transmission characteristics at the same time, the service model of data packets is different from that of the previous services, and the existing technology for scheduling without grant may not be applicable. The XR service data packet may not arrive strictly periodically, and there may be a certain range of jitter in each period. The strict periodic transmission for existing scheduling without grant may no longer be applicable. In addition, the size of XR service data packet may change within a certain range, and the fixed TBS transmission for existing scheduling without grant may no longer be applicable, and so on.

The embodiment of the present disclosure provides specific solutions aiming at the related enhancement of the technology for scheduling without grant, and through the method disclosed by the present disclosure, the number of payload bits is effectively reduced, the transmission efficiency is improved, and the transmission delay is effectively reduced.

Next, the implementation of the method performed by the user terminal provided by the embodiment of the present disclosure will be described in detail with reference to the accompanying drawings.

Figure 4:
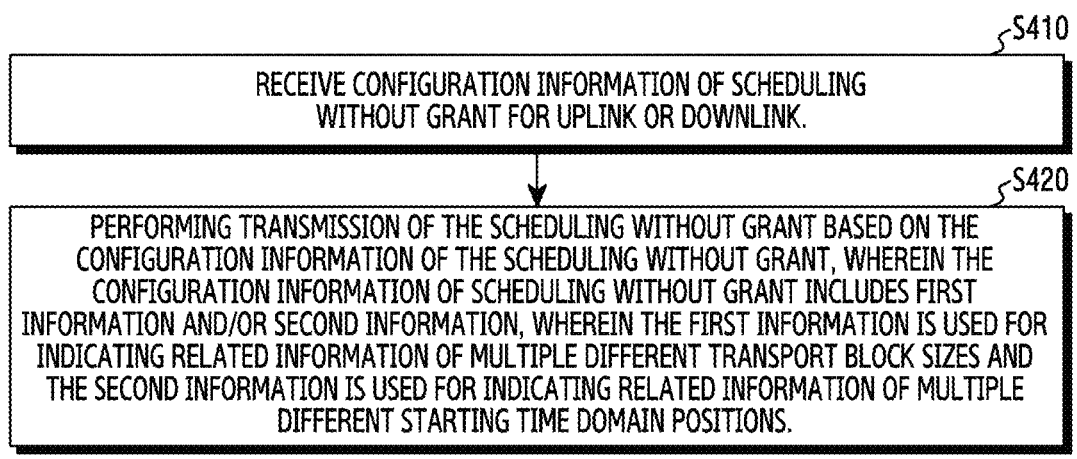
FIG. 4 illustrates a flowchart of a method performed by user equipment according to an embodiment of the present disclosure.

Please refer to FIG. 4, which illustrates a flowchart of a method performed by user equipment according to an embodiment of the present disclosure. The method may include steps S410 and S420.

In one example of S410, a UE receives configuration information of scheduling without grant for uplink or downlink.

In one example of S420, the UE, based on the configuration information of the scheduling without grant, performs the transmission of the scheduling without grant.

Herein, the configuration information of the scheduling without grant includes first information and/or second information. The first information is used for indicating related information of multiple different transport block sizes, specifically, the first information can be related information used for indicating that multiple different transport block sizes are supported within one transmission period. The second information is used for indicating related information of multiple different starting time domain positions, and specifically, the second information can be related information used for indicating that multiple different starting time domain positions are supported within one transmission period.

The method can effectively reduce the number of payload bits, improve the transmission efficiency and effectively reduce the transmission delay.

Various details of embodiments of the method performed by the user equipment will be described as below.

First of all, the case where the configuration information of the scheduling without grant only includes the first information, that is, scheduling without grant of which the transmission with multiple different transport block size (TBS) is supported in one transmission period, will be described below with reference to the attached drawings.

In the existing technology for scheduling without grant, the physical resource size and TBS for the transmission are semi-statically fixed, which may not be applicable to some service models. For example, for XR service, the size of data packets transmitted in one period is not definite, but fluctuates within a certain range. In the present disclosure, by configuring the scheduling without grant to support multiple TBSs, the number of payload bits is effectively reduced and the transmission efficiency is improved.

For the transmission of scheduling without grant for uplink (also known as SPS-PUSCH or CG-PUSCH), the configuration information of the scheduling without grant pre-stored at the UE side indicates the scheduling without grant of which the transmission with multiple different transport block sizes (TBSs) can be supported within one transmission period, and the UE selects one of the TBSs to transmit PUSCH according to the size of the actually arrived data packet. For example, the UE selects one TBS that can fully carry the data packet and has the smallest number of padding bits, which has the advantage of saving the number of padding bits as much as possible, thereby improving the transmission efficiency and also saving physical resources.

Accordingly, if the UE does not report the selected (i.e., actually used) TBS to the base station, the base station needs to blindly decode the PUSCH of the scheduling without grant based on these multiple TBSs; or if the UE reports the actually used TBS to the base station, the base station can first receive the report information of the TBS, and then decode the PUSCH of the scheduling without grant based on the actually used TBS reported.

For transmission of scheduling without grant for downlink (also known as SPS-PDSCH or CG-PDSCH), the configuration information of the scheduling without grant pre-stored at the UE side indicates the scheduling without grant of which the transmission with multiple different transport block sizes (TBSs) can be supported within one transmission period. The base station selects one of the TBSs to transmit PDSCH according to the size of the actually arrived data packet. For example, the base station selects one TBS that can fully carry the data packet and has the smallest number of padding bits, which has the advantage of saving the number of padding bits as much as possible, thereby improving the transmission efficiency and also saving physical resources.

Accordingly, if the base station does not inform the UE of the selected (i.e., actually used) TBS, the UE needs to blindly decode the PDSCH of scheduling without grant based on these multiple TBSs; or if the base station informs the UE of the actually used TBS, the UE may first receive the indication information of the TBS, and then decode the PDSCH of scheduling without grant based on the indicated TBS.

The following describes in detail how to configure multiple TBSs supported in one transmission period.

In an example, scheduling without grant supports multiple TBSs, which are explicitly indicated by the base station. For example, for Type 1 scheduling without grant for uplink, the base station may include information indicating multiple different transport block sizes in the RRC layer configuration message of the configuration information of scheduling without grant; for Type 2 scheduling without grant for uplink, the base station may include information indicating multiple different transport block sizes in the RRC layer configuration message or activating downlink control information (DCI) of scheduling without grant.

In another example, the scheduling without grant supports multiple TBSs, which are implicitly indicated by the base station. For example, the base station may include ratio information in the RRC layer configuration message of the configuration information of the scheduling without grant. The ratio information can be at least one of the following: respective ratio information of each transport block size relative to the reference transport block size; respective ratio information of the number of time domain resources corresponding to each transport block size relative to the number of time domain resources corresponding to the reference transport block size; respective ratio information of the size of frequency domain resources corresponding to each transport block size relative to the size of frequency domain resources corresponding to the reference transport block size; or respective ratio information of the transmission power corresponding to each transport block size relative to the transmission power corresponding to the reference transport block size.

Herein, the reference transport block size can be a predefined one of multiple transport block sizes, for example, the largest one or the smallest one. Of course, it is not limited to the largest TBS or the smallest TBS, and it can also be any TBS among the multiple transport block sizes. Furthermore, the time domain resources or frequency domain resources corresponding to the reference transport block size may be indicated in the configuration information of the scheduling without grant.

For example, the base station may include respective ratio information (i.e., reduction factor) of each TBS relative to the largest TBS in multiple transport block sizes in the first information of the configuration information of the scheduling without grant, and the reduction factor may be 0.8, 0.7, 0.6, or 0.5, etc.; or the base station may include respective ratio information (i.e., amplification factor) of each TBS relative to the smallest TBS in multiple transport block sizes in the first information of the configuration information of the scheduling without grant, and the amplification factor may be 1.1, 1.2, or 1.5, etc.; or the base station may indicate an amplification factor or a reduction factor of multiple TBSs relative to a predefined TBS among multiple transport block sizes.

For example, for Type 1 scheduling without grant for uplink, the base station may indicate ratio information of multiple TBSs relative to the reference TBS in multiple transport block sizes in the RRC layer configuration message of scheduling without grant, and the UE decides the reference TBS among multiple TBSs according to modulation coding scheme (MCS) information and physical resource allocation information included in the RRC layer configuration message of scheduling without grant, and then calculates other TBS according to the reference TBS and ratio information.

For example, for Type 2 scheduling without grant for uplink, the base station may indicate ratio information of multiple TBSs relative to the reference TBS in multiple TBSs in a RRC layer configuration message or activating DCI of scheduling without grant, and the UE determines the reference TBS in multiple TBSs according to MCS information and physical resource allocation information included in activating DCI of scheduling without grant, and then calculates other TBS according to the reference TBS and ratio information.

In another example, scheduling without grant supports multiple TBSs, and for different TBSs, the base station allocates the same modulation coding scheme (MCS) and time-frequency resource blocks with different sizes, for example, the base station may allocate frequency-domain resources with different sizes or time-domain resources with different sizes, herein, different sizes of frequency domain resources can correspond to different numbers of physical resource blocks (PRBs), and different sizes of time domain resources can correspond to different numbers of OFDM or SC-FDMA symbols, slots or repetitions, that is, different TBSs correspond to different numbers of available resource elements (REs), and the UE can decide the corresponding TBS based on the same MCS and different numbers of REs.

For example, for Type1 scheduling without grant for uplink, the base station may indicate ratio information of the time domain size (or the frequency domain size) of multiple TBSs relative to that of the reference TBS in multiple TBSs in the RRC layer configuration message of scheduling without grant, and the UE may decide the reference TBS in multiple TBSs according to MCS information and physical resource allocation information included in the RRC layer configuration message of scheduling without grant. That is, the physical resource allocation in the scheduling information without grant is with respect to the reference TBS. The time domain size (or frequency domain size) corresponding to other TBS is calculated according to the time domain size (or frequency domain size) corresponding to the reference TBS and the ratio information, and the corresponding TBS is further calculated in combination with MCS. Multiple TBSs share one same MCS.

For example, for Type2 scheduling without grant for uplink, the base station may indicate the ratio information of the time domain size (or frequency domain size) of multiple TBSs relative to that of the reference TBS in multiple TBSs in a RRC layer configuration message or activating DCI of scheduling without grant, and the UE decides the reference TBS in multiple TBSs according to MCS information and physical resource allocation information included in the activating DCI of scheduling without grant. That is, the physical resource allocation in the scheduling information without grant is with respect to the reference TBS. The time domain size (or frequency domain size) corresponding to other TBS is calculated according to the time domain size (or frequency domain size) corresponding to the maximum TBS and the ratio information, and then the corresponding TBS is further calculated in combination with MCS. Multiple TBSs share one same MCS.

For scheduling without grant that supports multiple TBSs, multiple TBSs can correspond to different time-frequency resources or transmission power. The calculation method of time-frequency resources or transmission power of multiple TBSs is described in detail below.

In an example, the scheduling without grant supports multiple TBSs, and the transmission corresponding to these TBSs use the same frequency domain resources and time domain resources with different sizes, that is, use physical resources with different sizes. For example, physical resources corresponding to multiple TBSs may occupy different numbers of time domain symbols (such as OFDMA symbols or SC-FDMA symbols), or occupy different numbers of slots (one slot containing multiple OFDMA symbols or SC-FDMA symbols), or occupy different numbers of repetitions.

Figure 5:
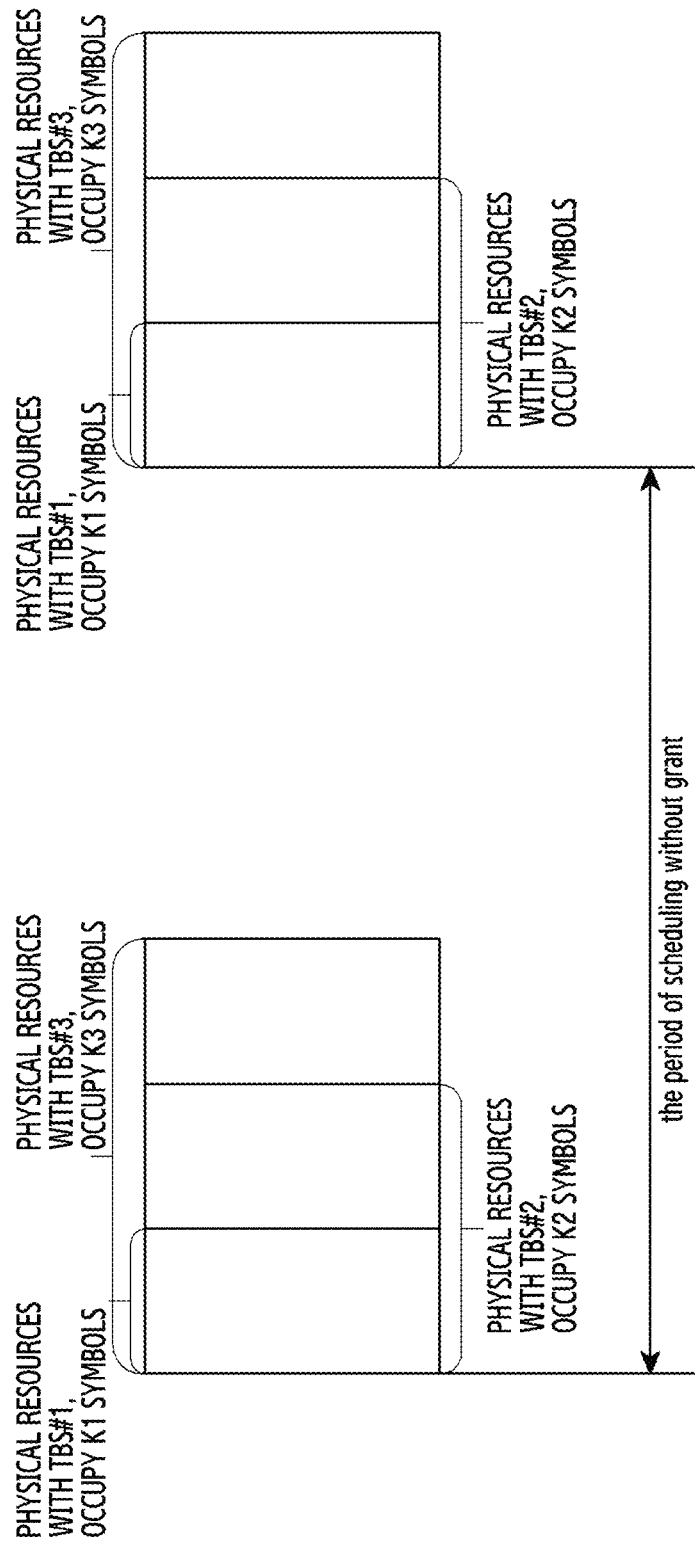
FIG. 5 illustrates a schematic diagram of a kind of physical resources corresponding to multiple transport block sizes according to an embodiment of the present disclosure.
Figure 6:
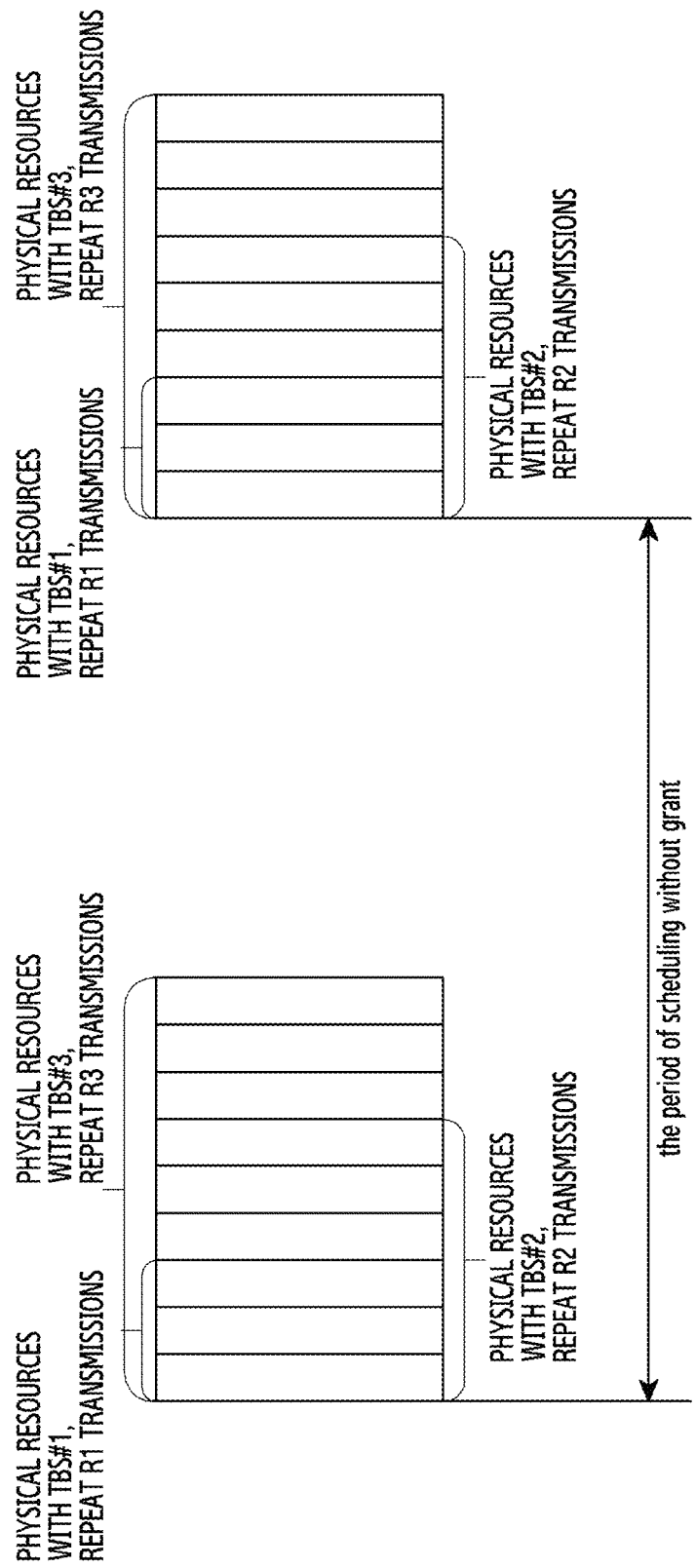
FIG. 6 illustrates a schematic diagram of another kind of physical resources corresponding to multiple transport block sizes according to an embodiment of the present disclosure.

Please refer to FIGS. 5 to 6. FIG. 5 illustrates a schematic diagram of a kind of physical resources corresponding to multiple transport block sizes (TBSs) according to an embodiment of the present disclosure. Please refer to FIG. 6. FIG. 6 illustrates a schematic diagram of another kind of physical resources corresponding to multiple transport block sizes (TBSs) according to an embodiment of the present disclosure.

As shown in FIG. 5, the scheduling without grant supports three TBSs (i.e., TBS #1, TBS #2 and TBS #3) for selection during an actual transmission, where TBS #1<TBS #2<TBS #3, and the physical resources corresponding to the three TBSs occupy the same frequency domain resources and different numbers of time domain symbols, the numbers of time domain symbols for transmissions of TBS #1, TBS #2 and TBS #3 are K1, K2, and K3, where K1<K2<K3, and the K3 symbols occupied by TBS #3 include the K2 symbols occupied by TBS #2, and the K2 symbols occupied by TBS #2 include the K1 symbols occupied by TBS #1.

Similarly, FIG. 5 is also applicable to the situation where different number of slots are occupied, that is, the physical resources with TBS #1, TBS #2 and TBS #3 occupy K1, K2 and K3 slots, respectively. As shown in FIG. 6, the three TBSs occupy different repetitions, that is, the transmissions for TBS #1, TBS #2 and TBS #3 occupy K1, K2 and K3 repetitions respectively.

The following describes how to calculate the number of time domain resources corresponding to each transport block size when different transport block sizes correspond to the same frequency domain resources and time domain resources with different sizes.

As an example, if multiple TBSs of scheduling without grant are directly and explicitly indicated, that is, the first information in the configuration information of scheduling without grant includes information indicating multiple different transport block sizes, the sizes of time domain resources $K_i$ corresponding to each transport block size can be calculated respectively based on the number of time domain resources $K_{ref}$ corresponding to the reference transport block size indicated in the configuration information of scheduling without grant, the reference transport block size $TBS_{ref}$, and the sizes of each transport block $TBS_i$. Herein, the granularity of the number of time domain resources is at least one of a symbol, a slot or a repetition.

Specifically, the calculation can be performed based on at least one of the following formulas:

$$K_i = \left\lfloor \frac{TBS_i}{TBS_{ref}} * K_{ref} \right\rfloor \text{ or } K_i = \left\lceil \frac{TBS_i}{TBS_{ref}} * K_{ref} \right\rceil.$$

Herein, $\lfloor \cdot \rfloor$ is a floor operation, $\lceil \cdot \rceil$ is a ceil operation.

Herein, the reference transport block size can be a predefined one of multiple transport block sizes, for example, the largest one or the smallest one. For example, when the reference transport block size is the largest TBS among multiple transport block sizes, the above formula evolves as follows:

$$K_i = \left\lfloor \frac{TBS_i}{TBS_{max}} * K_{max} \right\rfloor \text{ or } K_i = \left\lceil \frac{TBS_i}{TBS_{max}} * K_{max} \right\rceil.$$

Herein, $TBS_{max}$ is the maximum transport block size, and $K_{max}$ is the size of the time domain resources corresponding to the maximum transport block size.

As another example, if multiple TBSs of scheduling without grant are indirectly indicated by ratio information (i.e., scaling factor), i.e., the ratio information is included in the first information in the configuration information of the scheduling without grant (different examples of the ratio information can be referred to above, and will not be described in detail), then the sizes of the time domain resources $K_i$ corresponding to each transport block size can be calculated respectively based on the size of the time domain resources $K_{ref}$ corresponding to the reference transport block size indicated in the configuration information of scheduling without grant and the respective ratio information $S_i$ of the size of the time domain resources corresponding to each transport block size to the size of the time domain resources corresponding to the reference transport block size. Herein, the granularity of the number of time domain resources is at least one of a symbol, a slot or a repetition.

Specifically, the calculation can be performed based on at least one of the following formulas:

$K_i = \lfloor S_i * K_{ref} \rfloor$ or $K_i = \lceil S_i * K_{ref} \rceil$.

Herein, the reference transport block size can be a predefined one of multiple transport block sizes, for example, the largest one or the smallest one. For example, when the reference transport block size is the largest TBS among multiple transport block sizes, the above formula evolves as follows:

$K_i = \lfloor S_i * K_{max} \rfloor$ or $K_i = \lceil S_i * K_{max} \rceil$.

Herein, $K_{max}$ is the size of the time domain resources corresponding to the maximum transport block size.

In another example, the scheduling without grant supports multiple TBSs, and the transmission corresponding to these TBSs use the same time domain resources and frequency domain resources with different sizes, that is, use physical resources with different sizes. For example, physical resources corresponding to multiple TBSs may occupy different numbers of physical resource blocks (PRBs) or resource block groups (RBGs).

Figure 7:
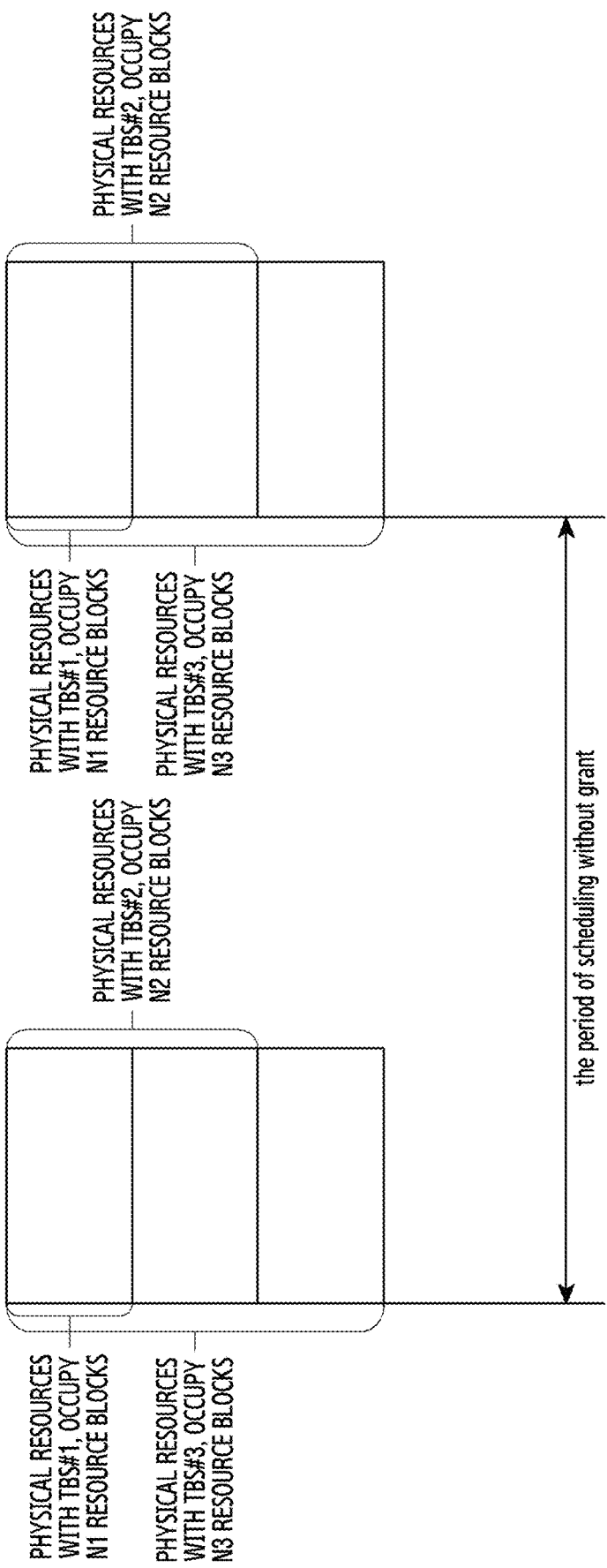
FIG. 7 illustrates a schematic diagram of yet another kind of physical resources corresponding to multiple transport block sizes according to an embodiment of the present disclosure.

Please refer to FIG. 7, FIG. 7 illustrates yet another schematic diagram of another kind of physical resources corresponding to multiple transport block sizes (TBSs) according to an embodiment of the present disclosure.

As shown in FIG. 7, the scheduling without grant supports three TBSs (i.e., TBS #1, TBS #2 and TBS #3) for selection during an actual transmission, herein, TBS #1<TBS #2<TBS #3, and the physical resources corresponding to the three TBSs occupy the same time domain resources and different numbers of PRBs, the numbers of PRBs for transmissions of TBS #1, TBS #2 and TBS #3 are N1, N2, and N3, respectively, herein, N1<N2<N3, and the N3 PRBs occupied by TBS #3 include the N2 PRBs occupied by TBS #2, and the N2 PRBs occupied by TBS #2 include the N1 PRBs occupied by TBS #1.

Similarly, FIG. 7 is also applicable to the situation where different numbers of resource block groups (RBGs) are occupied, that is, the physical resources with TBS #1, TBS #2 and TBS #3 occupy K1, K2 and K3 RBGs, respectively.

The following describes how to calculate the size of frequency domain resources corresponding to each transport block size when different transport block sizes correspond to the same time domain resources and frequency domain resources with different sizes.

As an example, if multiple TBSs of scheduling without grant are directly and explicitly indicated, that is, the first information in the configuration information of scheduling without grant includes information indicating multiple different transport block sizes, the sizes of frequency domain resources $N_i$ corresponding to each transport block size can be calculated respectively based on the size of frequency domain resources $N_{ref}$ corresponding to the reference transport block size indicated in the configuration information of scheduling without grant, the reference transport block size $TBS_{ref}$, and the sizes of each transport block $TBS_i$, herein the granularity of the sizes of frequency domain resources is at least one of physical resource block (PRB), or resource block group (RBG).

Specifically, the calculation can be performed based on at least one of the following formulas:

$$N_i = \left\lfloor \frac{TBS_i}{TBS_{ref}} * N_{ref} \right\rfloor \text{ or } N_i = \left\lceil \frac{TBS_i}{TBS_{ref}} * N_{ref} \right\rceil.$$

Herein, the reference transport block size can be a predefined one of multiple transport block sizes, for example, the largest one or the smallest one. For example, when the reference transport block size is the largest TBS among multiple transport block sizes, the above formula evolves as follows:

$$N_i = \left\lfloor \frac{TBS_i}{TBS_{max}} * N_{max} \right\rfloor \text{ or } N_i = \left\lceil \frac{TBS_i}{TBS_{max}} * N_{max} \right\rceil.$$

Herein, $TBS_{max}$ is the maximum transport block size, and $N_{max}$ is the size of the time domain resources corresponding to the maximum transport block size.

As another example, if multiple TBSs of scheduling without grant are indirectly indicated by ratio information (i.e., scaling factor), i.e., the ratio information is included in the first information in the configuration information of the scheduling without grant (different examples of the ratio information can be referred to above, and will not be described in detail), then the sizes of the frequency domain resources $N_i$ corresponding to each transport block size can be calculated respectively based on the size of the frequency domain resources $N_{ref}$ corresponding to the reference transport block size indicated in the configuration information of scheduling without grant and the respective ratio information $S_i$ of the size of the frequency domain resources corresponding to each transport block size relative to the size of the frequency domain resources corresponding to the reference transport block size, herein the granularity of the size of the frequency domain resources is at least one of a physical resource block (PRB) or a resource block group (RBG).

Specifically, the calculation can be performed based on at least one of the following formulas:

$$N_i = \lfloor S_i * N_{ref} \rfloor \text{ or } N_i = \lceil S_i * N_{ref} \rceil.$$

Herein, the reference transport block size can be a predefined one of multiple transport block sizes, for example, the largest one or the smallest one. For example, when the reference transport block size is the largest TBS among multiple transport block sizes, the above formula evolves as follows:

$$N_i = \lfloor S_i * N_{max} \rfloor \text{ or } N_i = \lceil S_i * N_{max} \rceil.$$

Herein, $N_{max}$ is the size of the frequency domain resources corresponding to the maximum transport block size (in another example, the scheduling without grant supports multiple TBSs, and the transmission corresponding to these TBSs use the same time domain resources, the same frequency domain resources, and different transmission powers.

For example, the scheduling without grant for uplink supports three TBSs (i.e., TBS #1, TBS #2 and TBS #3) for selection during actual transmission, herein, TBS #1<TBS #2<TBS #3, and the physical resources corresponding to the three TBSs occupy the same frequency domain resources, the same time domain symbols and different transmission power, the transmission power used for TBS #1, TBS #2 and TBS #3 are P1, P2 and P3 respectively, herein P1<P2<P3. The UE may decide the transmission power corresponding to the reference TBS (e.g., the maximum TBS) according to the conventional closed-loop power control method, and then determine the transmission power corresponding to other TBS by scaling down at a ratio based on the transmission power corresponding to the reference TBS (e.g., the maximum TBS).

The following describes how to calculate the transmission power corresponding to each transport block size when different transport block sizes correspond to the same time domain resources, the same frequency domain resources, and different transmission power.

As an example, if multiple TBSs of scheduling without grant are directly and explicitly indicated, that is, the first information in the configuration information of scheduling without grant includes information indicating multiple different transport block sizes, the transmission power $P_i$ (in a unit of dB) corresponding to each transport block size can be calculated respectively based on the transmission power $P_{ref}$ corresponding to the reference transport block size, the reference transport block size $TBS_{ref}$, and each of the transport block sizes $TBS_i$.

Specifically, the calculation can be based on the following formula:

$$P_i = LinearToDB\left(\frac{TBS_i}{TBS_{ref}} * DBToLinear(P_{ref})\right).$$

Herein, DBToLinear(•) is an operation of converting from decibel (dB) value to linear value, which may be, for example $10^{(•)/10}$, LinearToDB(•) is the operation of converting from linear value to decibel (dB) value, which may be for example $10 \log_{10}(•)$, $P_i$ is the size of the transmission power corresponding to each transport block size, $P_{ref}$ is the size of the transmission power corresponding to the reference transport block size.

Herein, the transmission power corresponding to the reference transport block size can be obtained by the existing power control calculation, and the reference transport block size is the largest one or the smallest one among the multiple transport block sizes. For example, when the reference transport block size is the largest TBS among multiple transport block sizes, the above formula evolves as follows:

$$P_i = LinearToDB\left(\frac{TBS_i}{TBS_{max}} * DBToLinear(P_{max})\right).$$

Herein, $P_{max}$ is the size of the transmission power corresponding to the maximum transport block size and $P_i$ is the size of the transmission power corresponding to each of the transport block sizes.

As another example, if multiple TBSs of scheduling without grant are indirectly indicated by ratio information (i.e., scaling factor), i.e., the ratio information is included in the first information in the configuration information of the scheduling without grant (different examples of the ratio information can be referred to above, and will not be described in detail), then the transmission power $P_i$ corresponding to each of the transport block sizes can be calculated respectively based on transmission power $P_{ref}$ corresponding to the reference transport block size and the respective ratio information $S_i$ of the transmission power corresponding to each of the transport block sizes relative to the transmission power corresponding to the reference transport block size.

Specifically, the calculation can be based on the following formula:

$P_i$=LinearToDB($S_i$*DBToLinear($P_{ref}$)).

Herein, the reference transport block size can be the largest one or the smallest one among the multiple transport block sizes. For example, when the reference transport block size is the largest TBS among multiple transport block sizes, the above formula evolves as follows:

$P_i$=LinearToDB($S_i$*DBToLinear($P_{max}$)).

In yet another example, the scheduling without grant supports multiple TBSs, and the resource allocation corresponding to these TBSs can be any one of the above solutions, depending on the base station allocation. For example, the base station can configure multiple TBSs to use the same frequency domain resources and time domain resources with different sizes; or the base station may configure multiple TBSs to use the same time domain resources and frequency domain resources with different sizes; or the base station may configure multiple TBSs to use the same time-frequency domain resources and transmission power with different sizes.

The following is a detailed introduction of the TBS actually used in the transmission of the scheduling without grant.

For the scheduling without grant for uplink supporting multiple TBSs, the following describes how the UE reports the TBS actually used by the PUSCH of the scheduling without grant to the base station. For the scheduling without grant for downlink supporting multiple TBSs, the following describes how the base station indicates to the UE the information of the TBS actually used by the PDSCH of the scheduling without grant.

In an example, the scheduling without grant supports multiple TBSs, and the TBS actually used in the transmission of the scheduling without grant is explicitly indicated. For example, the information of the actually used TBS is coded separately, and is transmitted by occupying part of resources of PDSCH or PUSCH of the scheduling without grant.

For scheduling without grant for uplink supporting multiple TBSs, the UE can transmit the indication information of the transport block size used by the PUSCH on the first symbol or the first few symbols of the transmission resources of the PUSCH of the scheduling without grant, which has the advantage that the base station can detect the actually used TBS information of the PUSCH of the scheduling without grant as early as possible, so that the base station does not need to blindly decode the PUSCH, thus reducing the decoding times of the PUSCH and reducing the power consumption of the base station. In addition, if the TBS information actually used by the PUSCH of the scheduling without grant received by the base station is a smaller TBS among multiple TBSs, the resources additionally allocated to a larger TBS can be released for use by other UE.

For scheduling without grant for downlink supporting multiple TBSs, the base station can transmit the indication information of the transport block size used by PDSCH on the first symbol or the first few symbols of the transmission resources of PDSCH of the scheduling without grant, which has the advantage that the UE can detect the actually used TBS information of PDSCH of the scheduling without grant as early as possible, so that the UE does not need to decode PDSCH blindly, thus reducing the decoding times of PDSCH and reducing the power consumption of UE.

For example, by adopting a similar method to the configured grant uplink control information (CG-UCI) piggybacked by the configured grant physical uplink shared channel PUSCH (CG-PUSCH), the actually used TBS information of the PDSCH or PUSCH is piggybacked and carried on the PDSCH or PUSCH of the scheduling without grant, that is, the code rate of the TB S information is determined according to the code rate of the PDSCH or PUSCH and the code rate difference (beta_offset) between the TBS information and the data channel, thereby determining the number of resource elements used for TBS information transmission. Then the encoded TBS information is mapped to part of resources of PDSCH or PUSCH according to predefined rules, herein the code rate difference (beta_offset) is the number of resources used to determine CG-UCI transmission when CG-UCI is piggybacked for transmission on CG-PUSCH; or TBS information is transmitted by using a fixed number of resource elements in resources of PDSCH or PUSCH of the scheduling without grant, that is, TBS information is transmitted by using a fixed code rate.

In another example, the scheduling without grant supports multiple TBSs, and the TBS actually used in the transmission of the scheduling without grant is implicitly indicated. For example, the transmitting end implicitly indicates TBS information through a demodulating the reference signal (DMRS) sequence, and the receiving end tries to decode the transmission of the scheduling without grant based on different DMRS sequences, that is, the transmission corresponding to different TBSs uses different DMRS sequences, and the generation of the DMRS sequence is related to the index number of the TBS. For example, the calculation formula for generating the random seed of the DMRS sequence may include the index number of the TBS, and the index number of the TBS is the number of the TBS among multiple TBSs supported by the scheduling without grant.

Or the transmitting end implicitly carries TBS information through different cyclic redundancy check (CRC) scrambling sequences, and the receiving end blindly decodes the transmission of the scheduling without grant based on different CRC scrambling sequences, that is, the transmissions corresponding to different TBSs use different CRC scrambling sequences.

The following will continue to introduce the contents related to reporting UE decoding capability.

Figure 8:
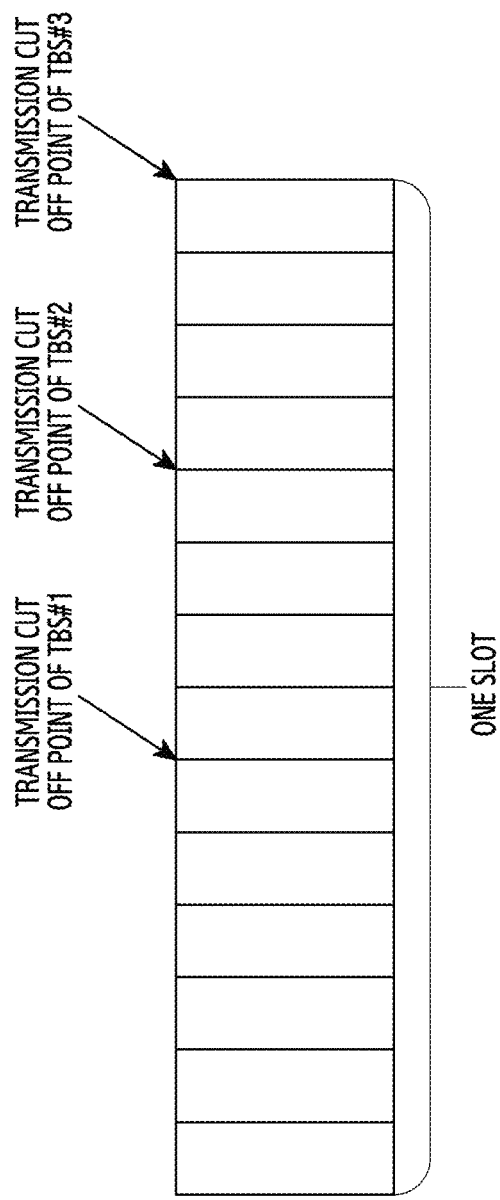
FIG. 8 illustrates a schematic diagram of transmission cut off points corresponding to multiple transport block sizes according to an embodiment of the present disclosure.

Please refer to FIG. 8, which illustrates a schematic diagram of transmission cut-off points corresponding to multiple transport block sizes (i.e., TBS #1, TBS #2 and TBS #3) according to an embodiment of the present disclosure.

As mentioned above, the transmissions of different TBSs can occupy the same frequency domain resources and different numbers of symbols. As shown in FIG. 7, TBS #1 transmission corresponds to 6 symbols, TBS #2 transmission corresponds to 10 symbols, and TBS #3 transmission corresponds to 14 symbols. For scheduling without grant for downlink, if the UE needs to blindly decode the PDSCH of the scheduling without grant based on different TBSs, it needs to decode for three times in one slot, which needs to enhance the decoding ability of existing UE, which is not realized by all UE.

Therefore, the UE can report information indicating the capability of the user equipment to the base station, and the base station configures whether the scheduling without grant for downlink for the UE supports multiple TBSs according to the information reported by the UE indicating the capability of the user equipment.

The information indicating the capability of the user equipment can be at least one of the following: capability information for indicating the maximum number of physical downlink shared channels PDSCHs that the user equipment can decode in the same slot; capability information for indicating whether the user equipment supports transmissions of the scheduling without grant with multiple different transport block sizes; capability information for indicating whether the user equipment supports transmissions of the scheduling without grant with multiple different starting time domain positions; or capability information for indicating whether the user equipment supports transmissions of the scheduling without grant with multiple different transport block sizes and multiple different starting time domain positions at the same time.

The following describes the content related to the retransmission of the scheduling without grant.

In an example, the transmission (i.e., an initial transmission) of the scheduling without grant supports multiple TBSs, and the corresponding retransmission is based on dynamic scheduling and only supports one TBS. During an initial transmission, the transmitting end selects one of multiple TBSs for transmission according to the actually arrived data packet size. As mentioned above, the transmitting end can separately encode and inform the receiving end of the information of the actually used TBS, and the information of the actually used TBS has higher transmission reliability than the scheduling without grant. Even if the receiving end fails to decode the scheduling without grant successfully, the receiving end can still successfully receive the information of the actually used TBS of the transmitting end. Then, since the retransmission scheduled based on downlink control information (DCI) does not need to support multiple TBSs, the TBS determined according to MCS and physical resource allocation indicated by the scheduling DCI of retransmission may be the actual TBS of the retransmission.

For the scheduling without grant for downlink, the TBS determined according to the scheduling DCI of the retransmission is the actual transmission TBS, and the physical resources indicated by the scheduling DCI of the retransmission are the resources occupied by the actual transmission, and the UE does not need to decode the retransmission scheduling based on different TBSs. If the TBS of the retransmission is different from the TBS actually used in the initial transmission received by the UE, whether the UE decodes this retransmission depends on the example of the UE; or the UE considers the scheduling DCI of this retransmission as error decoding, and gives up decoding this retransmission; or the UE considers the received TBS actually used in the initial transmission as error decoding, the UE decodes this retransmission and combines the retransmission with the soft bit information of the corresponding TBS in the initial transmission for decoding.

For the scheduling without grant for uplink, the TBS determined according to the scheduling DCI of the retransmission may be the TBS of the actual transmission, and the physical resources indicated by the scheduling DCI of the retransmission may be the resources occupied by the actual transmission. If the TBS determined according to the scheduling DCI of the retransmission is different from the TBS selected by the UE during an initial transmission, whether the UE transmits the corresponding PUSCH for the scheduling of this retransmission depends on the example of the UE; or the UE considers the scheduling DCI of this retransmission as error decoding and does not transmit the corresponding PUSCH; or if the TBS determined according to the scheduling DCI of the retransmission is larger than the TBS used by the UE during the initial transmission, the UE transmits the data packet according to the TBS determined by the scheduling DCI of the retransmission, otherwise, the UE does not transmit the corresponding PUSCH; or if the TBS determined according to the scheduling DCI of the retransmission is larger than the TBS used by the UE during the initial transmission, the UE transmits the PUSCH according to the TBS used during the initial transmission, and the resources used by the PUSCH can use part of the resources scheduled for retransmission, the specific determination method of which is similar to that of the initial transmission, otherwise, the UE does not transmit the corresponding PUSCH.

In another alternative example, the initial transmission of the scheduling without grant supports multiple TBSs, and the corresponding retransmission is based on dynamic scheduling, and still supports multiple TBSs, regardless of whether the transmitting end separately encodes and informs the receiving end of the information of the actually used TBS. For example, TBS determined according to MCS and physical resources indicated by scheduling DCI of the retransmission is a reference TBS (e.g., maximum TBS), and physical resources allocated by the scheduling of the retransmission are transmission resources corresponding to the reference TBS (e.g., maximum TBS), and the transmitting end uses the corresponding transmission resources according to the actually used TBS.

The user equipment performs the transmission of the scheduling without grant based on the configuration information of scheduling without grant for the uplink or downlink pre-configured by the base station, as above, herein, the configuration information of the scheduling without grant includes the first information for indicating to support the scheduling without grant for transmissions with multiple different transport block sizes within one transmission period, which can effectively reduce the number of payload bits and improve the transmission efficiency.

The following will continue to introduce the situation that the configuration information of the scheduling without grant only includes the second information, that is, the scheduling without grant for transmissions with multiple different starting time domain positions is supported in one transmission period.

In the existing technology for scheduling without grant, only the transmission with one definite starting time domain position is supported in one period, which may not be applicable to some service models. For example, for XR service, the arrival time of data packets in one period is not certain, but jitters in a certain range. If the scheduling without grant can support the transmission with multiple different starting time domain positions in one period, the transmission delay can be effectively reduced.

In scheduling without grant for downlink (also known as SPS-PDSCH or CG-PDSCH), the transmission with multiple different starting time domain positions can be supported in one period, and the base station selects one of the starting time domain positions to transmit PDSCH according to the actual arrival time of data packets, so as to reduce the transmission delay as much as possible. The UE can try to decode the PDSCH of the scheduling without grant at each starting time domain position. If the PDSCH of the scheduling without grant is received at one starting time domain position, it is not necessary to try to decode the PDSCH of the scheduling without grant at the subsequent starting time domain positions.

In scheduling without grant for uplink (also called SPS-PUSCH or CG-PUSCH), the transmission with multiple different starting time domain positions can be supported in one period, and the UE selects one of the starting time domain positions to transmit PUSCH according to the actual arrival time of data packets, so as to reduce the transmission delay as much as possible. The base station can try to decode a PUSCH of the scheduling without grant at each starting time domain position. If the PUSCH of the scheduling without grant is received at one starting time domain position, it is not necessary to try to decode the PUSCH of the scheduling without grant at the subsequent starting time domain positions.

The following describes in detail the configuration modes of several different starting time domain positions.

In an example, the scheduling without grant can support the transmission with multiple different starting time domain positions in one period, and the transmission with multiple different starting time domain positions use the same frequency domain resources and different time domain resources, herein, the time domain resources are completely the same in size, only different in the time domain positions, and the multiple different starting time domain positions can be indicated by the first starting time domain resource position and the intervals of other starting time domain positions relative to the first starting time domain position; or multiple different starting time domain positions can be indicated by the first starting time domain resource position and the intervals of other starting time domain positions relative to the respective previous starting time domain positions.

In addition, the interval size of any two adjacent starting time domain positions can be the same, so multiple different start time domain positions can be indicated by the first start time domain resource position, the interval between two adjacent starting time domain positions, and the number of multiple different starting time domain positions. Depending on the configuration of the base station, transmissions with different initial time domain locations may occupy completely different time domain resources or partially overlapping time domain resources.

For example, for Type 1 CG-PUSCH, the base station indicates the first starting time domain position and the intervals of other starting time domain positions relative to the first starting time domain position in the RRC layer configuration message of scheduling without grant; for Type 2 CG-PUSCH, the base station indicates the first starting time domain position in the activating DCI of the scheduling without grant, and indicates the intervals of other starting time domain positions relative to the first starting time domain position in the RRC layer configuration message of the scheduling without grant.

Figure 9:
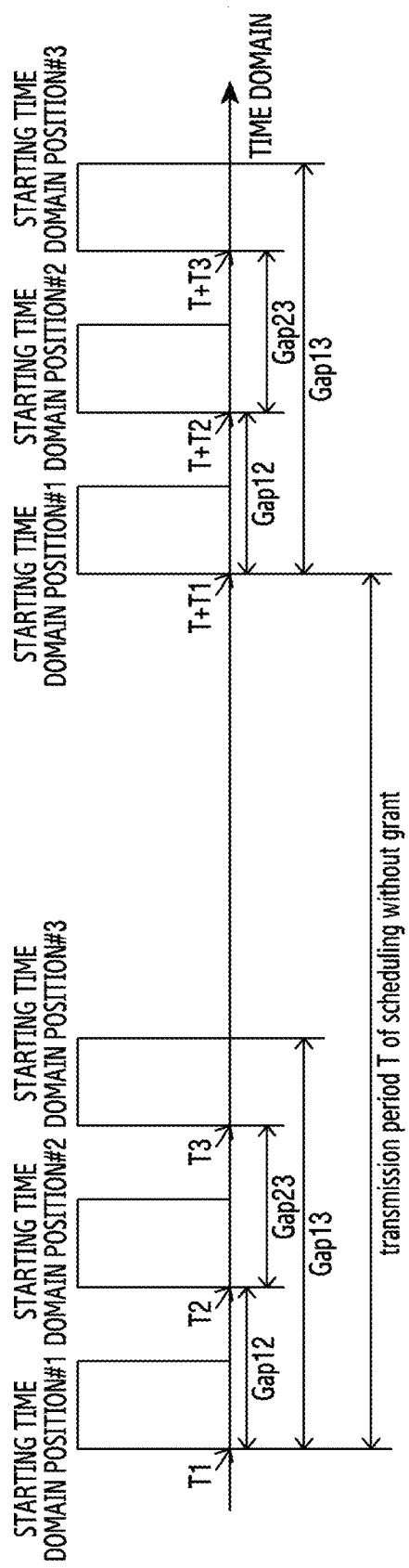
FIG. 9 illustrates a schematic diagram of multiple starting time domain positions according to an embodiment of the present disclosure.

Please refer to FIG. 9, which illustrates a schematic diagram of multiple starting time domain positions (that is, T1, T2, T3) according to an embodiment of the present disclosure.

For example, as shown in FIG. 9, the configuration information of scheduling without grant indicates the starting time domain position #1 (that is, the first starting time domain position) T1, the starting time domain position #2 T2 is indicated by Gap12, that is, T2 is determined according to T1 and Gap12, and the starting time domain position #3 T3 is indicated by Gap13 or Gap23, that is, T3 is determined according to T1 and Gap13 or T2 and Gap23.

In another example, the scheduling without grant can support transmission with multiple different starting time domain positions within one period, and the multiple different starting time domain positions are indicated by defining one time domain window. For example, the second information of the configuration information of the scheduling without grant includes the indication information of the time domain windows where the multiple different starting time domain positions are located, such as the starting time domain position and size of the time domain windows, where the starting time domain position corresponds to the first starting time domain position among the multiple different starting time domain positions, and each slot in the window of the starting time domain position is a possible starting time domain position, or every N slots in the window of the starting time domain position are possible starting time domain positions, where N is a predefined or pre-configured value. That is, the size of the interval between any two adjacent starting time domain positions in the time domain window is the same and is predefined or pre-configured.

Figure 10:
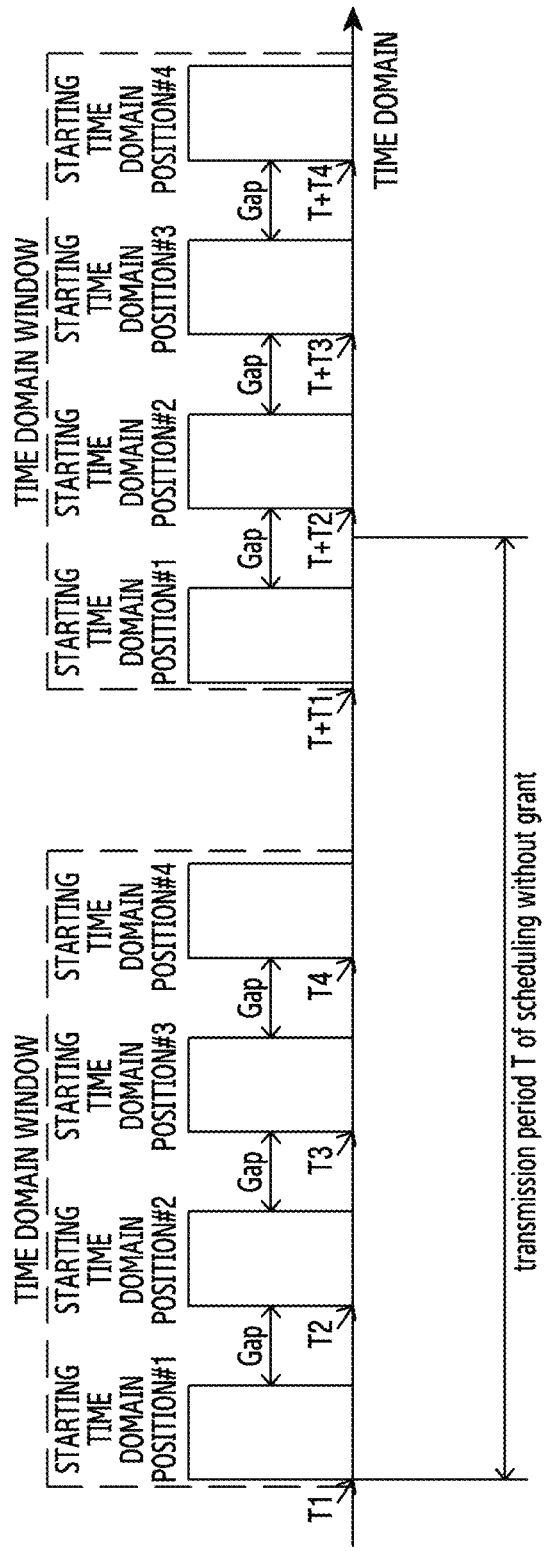
FIG. 10 illustrates a schematic diagram of multiple different starting time domain positions within a time domain window according to an embodiment of the present disclosure.

Please refer to FIG. 10, which illustrates a schematic diagram of multiple different starting time domain positions (i.e., T1, T2, T3, T4) within a time domain window according to an embodiment of the present disclosure.

For example, as shown in FIG. 10, the second information of the configuration information of the scheduling without grant includes indication information of the time domain windows where the multiple different starting time domain positions are located, such as the starting time domain position and size of the time domain windows, and possibly indicating the gap between two adjacent starting time domain positions. According to such information, the UE can decide T1, T2, T3, and T4 of the four starting time domain positions in the time domain window, wherein the time domain starting position of the time domain window corresponds to the first starting time domain position among the multiple different starting time domains by default.

The following describes the relevant contents of the starting time domain position actually used by the transmission of the scheduling without grant.

In an example, the scheduling without grant can support transmissions with multiple different starting time domain positions within one period, and the information of the actually used starting time domain position can be implicitly indicated, for example, the actually used starting time domain position (i.e., one starting time domain position selected from multiple starting time domain positions) is implicitly indicated by different DMRS sequences, in other words, multiple different starting time domain positions supported in one period use different DMRS sequences, and the transmitting end uses a corresponding DMRS sequence according to the actually used starting time domain position, for example, the parameter of the index number can be included in the calculation formula of random seeds generated by DMRS sequences.

Or, the transmitting end implicitly carries the actually used starting time domain position through different CRC scrambling sequences, and the receiving end blindly decodes the transmission of the scheduling without grant based on different CRC scrambling sequences, that is, different corresponding transmission use different CRC scrambling sequences.

In another example, the scheduling without grant can support transmissions with multiple different starting time domain positions within one period, and the information of the actually used starting time domain position can be explicitly indicated. For example, the actually used starting time domain location can be independently coded to occupy the first symbol or the first few symbols of the resources of the scheduling without grant, so that after receiving the information, the receiving end does not need to blindly decode the scheduling without grant at different starting time domain locations, but can directly decode the scheduling without grant at the received starting time domain location.

The user equipment performs the transmission of the scheduling without grant based on the configuration information of scheduling without grant for the uplink or downlink pre-configured by the base station, as above, wherein the configuration information of the scheduling without grant includes the second information for indicating to support the scheduling without grant for transmissions with multiple different starting time domain positions within one transmission period, which can effectively reduce the transmission delay.

Finally, the case where the configuration information of the scheduling without grant includes the first information and the second information, that is, the scheduling without grant supporting transmission with multiple different transport block sizes and multiple different starting time domain positions within a transmission period, is described in the following in combination with the figures.

As mentioned above, the scheduling without grant that supports transmission with multiple different transport block sizes in one transmission period is suitable for periodic services with variable data packet sizes, and the scheduling without grant that supports transmissions with multiple different starting time domain positions in one transmission period is suitable for periodic services with variable data packet arrival time. The present disclosure also provides the scheduling without grant that supports transmission with multiple different transport block sizes and multiple different starting time domain positions within one transmission period, so as to be suitable for periodic services with the characteristics of unfixed data packet size and unfixed data packet arrival time within one transmission period.

In this embodiment, the scheduling without grant can simultaneously support transmission with multiple different transport block sizes and multiple different starting time domain positions in one transmission period. For scheduling without grant for downlink, the UE can select one of multiple different TBSs according to the size of the actually arrived data packet, and can also select one of multiple different starting time domain positions according to the actual arrival time of the data packet. For scheduling without grant for uplink, the base station can select one of multiple different TBSs according to the actually arrived data packet size, and can also select one of multiple different starting time domain positions according to the actually arrived data packet time.

Figure 11A:
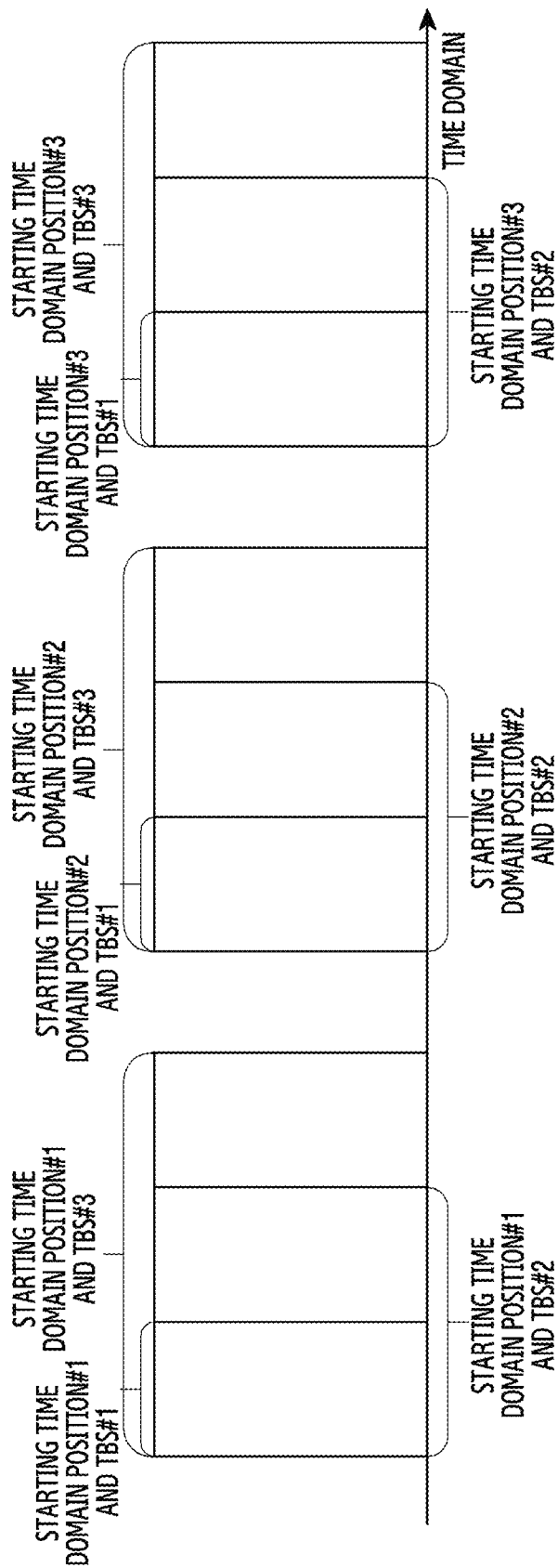
FIG. 11A illustrates a schematic diagram of supporting transmissions with multiple different transport block sizes and multiple different starting time domain positions within one transmission period according to an embodiment of the present disclosure.

Please refer to FIG. 11A, which illustrates a schematic diagram of supporting transmissions with multiple different transport block sizes and multiple different starting time domain positions in one transmission period according to an embodiment of the present disclosure.

As shown in FIG. 11A, the scheduling without grant supports transmission with three different starting time domain positions, and supports three different TBSs for the same starting time domain position. Here, the transmission corresponding to three different TBSs with the same starting time domain position use the same frequency domain resources and time domain resources with different sizes, that is, the transmission corresponding to three different TBSs with the same starting time domain position correspond to different ending time domain positions. If the TBS and the starting time-domain location actually selected by the transmitting end are not informed to the receiving end in advance, the receiving end needs to perform blind decoding for three different starting time-domain locations, and for each starting time-domain location, the receiving end needs to perform blind decoding for three different TBSs, thus a total of nine times of blind decoding are needed.

In an example, the transmission resources at different starting time domain positions are non-overlapping; in another example, the transmission resources at different starting time domain positions can partially overlap; in yet another example, the transmission resources at different starting time domain positions may not overlap or partially overlap, depending on the configuration of the base station.

If the scheduling without grant can simultaneously support transmission with multiple different transport block sizes and multiple different starting time-domain positions in one transmission period, and different transmission resources partially overlap, then different starting time-domain positions may have the same ending time-domain position, that is, at the same time-domain position, the receiving end needs blind decoding for multiple times, which requires enhancing the decoding ability of the receiving end.

In an example, a UE reports capability information to a base station for indicating whether the user equipment supports transmission of the scheduling without grant with multiple different transmission sizes and multiple different starting time domain positions at the same time; in another example, the UE reports to the base station whether the UE supports the capability of blind decoding for multiple times, wherein the maximum number of blind decoding supported by the UE needs to be greater than a predefined value; in yet another example, the UE reports the specific capability of blind decoding to the base station, for example, the UE reports the capability information of the maximum number of physical downlink shared channels PDSCH that can be decoded in the same slot, and the system can rank the maximum number of blind decoding.

The UE performs the transmission of the scheduling without grant based on the configuration information of scheduling without grant for the uplink or downlink pre-configured by the base station, as above, wherein the configuration information of the scheduling without grant includes the first information for indicating to support the scheduling without grant for transmissions with multiple different transport block sizes within one transmission period and the second information for indicating to support the scheduling without grant for transmissions with multiple different starting time domain positions within one transmission period, which can effectively reduce the number of payload bits, improve the transmission efficiency and effectively reduce the transmission delay.

When the transmission period of scheduling without grant is large, the channel quality of different transmission periods may change greatly. If the same MCS is used for transmissions of the scheduling without grant in each transmission period, it may inevitably lead to low transmission efficiency (when the MCS actually used is lower than the MCS corresponding to the channel quality) or the transmission reliability cannot be guaranteed (when the MCS actually used is higher than the MCS corresponding to the channel quality). If the transmitting end can choose the best MCS according to the channel quality of each transmission period, it can effectively improve the transmission efficiency.

In addition, if the sizes of the arriving packets of periodic data services are different in each transmission period of scheduling without grant, and the base station pre-allocates physical resources with the same size in each transmission period, then the transmitting end can select the best MCS according to the sizes of the arriving packets in each transmission period. The so-called best MCS means that the TBS determined according to the best MCS and the total number of resource elements is the smallest TBS capable of carrying the arriving packet sizes. For example, when the size of the arrived data packets is small, the transmitting end can choose a lower MCS to transmit a smaller TBS, so the padding bits in the MAC layer can be reduced as much as possible to improve the transmission efficiency, and the lower MCS can also reduce the transmission power and improve the transmission reliability, which is very suitable for the transmission of the scheduling without grant for uplink, because it is difficult to release some uplink physical resources pre-allocated by the base station for other terminals to use.

Therefore, in the above two scenarios, it may be more beneficial if the transmitting end can select a MCS by itself in each transmission period of the scheduling without grant. In an example, the scheduling without grant can support multiple MCSs for the transmitting end to choose, and the transmitting end selects the best MCS according to the channel quality in each transmission period of scheduling without grant, or the transmitting end selects the best MCS according to the arrived data packet size in each transmission period of scheduling without grant. During one transmission period, if the transmitting end does not inform the receiving end of the MCS actually used, the receiving end needs to blindly decode the transmission of the scheduling without grant for multiple candidate MCSs. If the transmitting end informs the receiving end of the MCS actually used, the receiving end decodes the transmission of the scheduling without grant based on the informed MCS. Herein, the transmitting end refers to the equipment that transmits the transmission of the scheduling without grant, and the receiving end refers to the equipment that receives the transmission of the scheduling without grant.

Figure 11B:
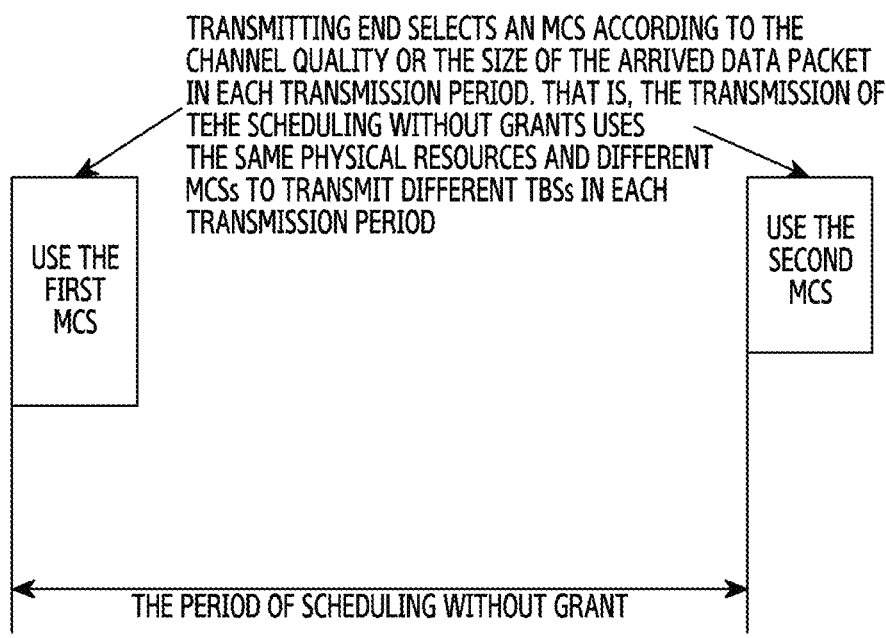
FIG. 11B illustrates that the transmitting end uses physical resources of the same size and different MCSs to transmit different TBSs in each transmission period according to an embodiment of the present disclosure.

In an example, the transmission of the scheduling without grant supports multiple MCSs for the transmitting end to select. For example, the configuration message or activating DCI of the scheduling without grant contains one MCS set for the transmitting end to select, and the transmitting end selects one best MCS in this MCS set according to the channel quality in each transmission period, and/or the transmitting end selects one best MCS in this MCS set according to the size of the arrived data packets in each transmission period, and pre-configured values are used for all other scheduling parameters except MCS, including scheduled time-frequency domain resources, that is, the same time-frequency domain resources are used in each transmission period. Since the MCS may be different in each transmission period, the corresponding TBS may also be different in each transmission period. If the MCS level selected by the transmitting end is lower, the corresponding TBS is smaller, and if the MCS level selected by the transmitting end is higher, the corresponding TBS is larger. As shown in FIG. 11B, the transmitting end uses physical resources with the same size and different MCSs to transmit different TBS in each transmission period, for example, a first MCS is selected in one transmission period of scheduling without grant and a second MCS is selected in another transmission period of scheduling without grant.

For typical periodic data services, the sizes of data packets arrived in each period are the same or similar. Therefore, the TBS with the same or similar size may be transmitted by scheduling without grant as much as possible in each transmission period. In another example, the transmission of the scheduling without grant supports multiple MCSs for the transmitting end to select. For example, the configuration message or activating DCI of the scheduling without grant contains one MCS set for the transmitting end to select, and the transmitting end selects one best MCS in this MCS set according to the channel quality in each transmission period. Further, in order to enable TBS with the same or similar size to be transmitted in each transmission period, the transmitting end may use physical resources with corresponding size in the pre-configured scheduling resources according to the selected MCS. If the MCS level selected by the transmitting end is low (i.e., the code rate is low), all or a large part of the pre-configured physical resources may be used; if the MCS level selected by the transmitting end is high (i.e., the code rate is high), a small part of the pre-configured physical resources may be used.

For example, the system specifies that the smallest MCS in the MCS set of configured for transmission of the scheduling without grant is called the reference MCS, the transmission of the reference MCS uses all the scheduling resources configured for the transmission of the scheduling without grant by default, the transmission of other MCS other than the reference MCS uses part of the scheduling resources configured for the transmission of the scheduling without grant, and the TBS determined by the reference MCS and all of the pre-configured time-frequency domain resources is called the reference TBS. TBS determined by other MCS and a part of the pre-configured time-frequency domain resources may be equal to or as close as possible to the reference TBS, that is, the physical resource size actually used by the transmission of the scheduling without grant in one transmission period is related to the selected MCS, and the used physical resource size may be such that the TBS obtained based on the selected MCS is the minimum TBS greater than or equal to the reference TBS. Here, in order to avoid resource fragmentation, the minimum granularity of physical resources actually used is one physical resource block in frequency domain and one symbol or slot in time domain.

Figure 11C:
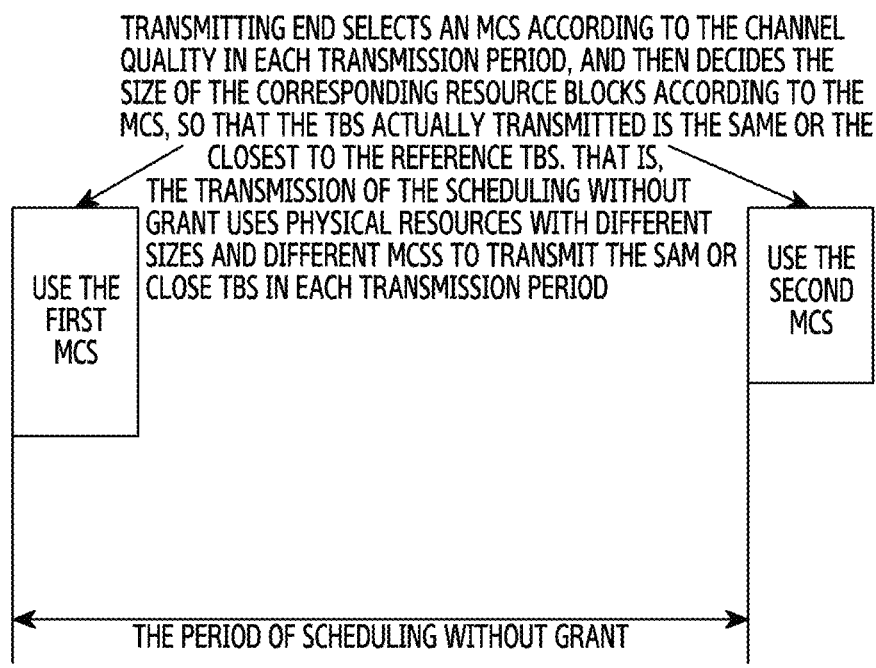
FIG. 11C illustrates that the transmitting end uses physical resources with different size and different MCSs to transmit the same or similar TBS in each transmission period according to an embodiment of the present disclosure.

The transmitting end can calculate the number of physical resource blocks and/or time-domain symbols/slots corresponding to MCS according to a predefined rule, and the calculation rule is that the number of physical resource blocks and/or time-domain symbols/slots corresponding to a certain MCS may be such that the TBS determined based on the MCS is the minimum TBS greater than or equal to the reference TBS, herein, the reference TBS is determined by the reference MCS and all scheduling resources pre-configured for the transmission of the scheduling without grant. As shown in FIG. 11C, the transmitting end uses physical resources with different sizes and different MCS to transmit the same or similar TBS in each transmission period. For example, the first MCS and all of the pre-configured physical resources are selected in one transmission period of scheduling without grant, while the second MCS and a part of the pre-configured physical resources are selected in a second transmission period of scheduling without grant.

In one transmission period, if the transmitting end selects an MCS with higher bit rate according to the channel quality, based on the reference TBS, the number of corresponding physical resource blocks determined by the MCS may be smaller than the total number of pre-configured physical resource blocks, that is, the transmitting end may select part of the pre-configured physical resource blocks to transmit data, assuming that the total number of pre-configured physical resource blocks is F and the number of physical resource blocks selected by the transmitting end is F'. For the transmission of the scheduling without grant for downlink, the base station can use F' consecutive physical resource blocks from the physical resource block with the lowest index number (or the highest index number) by default, where continuity herein refers to relative continuity among the F physical resource blocks, rather than absolute continuity in frequency domain; for the transmission of the scheduling without grant for uplink, because the pre-configured frequency domain physical resources are difficult to be reallocated to other UE, the UE can use F' relatively continuous physical resource blocks in the middle among the F physical resource blocks, that is, the two sides of the frequency domain resource are vacated with the same or close number of physical resource blocks, which has the advantage of reducing the adjacent frequency interference between frequency domain multiplexed UE in the cell.

In one transmission period, if the transmitting end selects an MCS with higher bit rate according to the channel quality, based on the reference TBS, the number of corresponding time domain symbols/slots determined by the MCS may be smaller than the total number of pre-configured time domain symbols/slots, that is, the transmitting end may select part of the pre-configured time domain symbols/slots to transmit data, assuming that the total number of pre-configured time domain symbols/slots is T and the number of time domain symbols/slots selected by the transmitting end is T', most directly, the transmitting end can use T' consecutive time-domain symbols/slots from the first time-domain symbol/slot, where continuous herein means relatively continuous in T time-domain symbols/slots, rather than absolutely continuous in time domain.

In order to support multiple MCSs for the transmitting end to select, a configuration message or activating DCI of the transmission of the scheduling without grant contains one MCS set, and the size N of the set can be predefined or pre-configured. The transmitting end selects an appropriate MCS based on this MCS set in each transmission period; or a configuration message or activating DCI of the transmission of the scheduling without grant does not contain an MCS set, but only contains one reference MCS, and the MCS set used for the transmitting end to select contains by default the reference MCS and the closest N−1 MCSs higher (or lower) than the reference MCS level, that is, the MCS set used for transmitting end to select has a size of N, which can be predefined or pre-configured, wherein the so-called closest N−1 MCSs higher (or lower) than the reference MCS level can be based on the MCS table in the existing system, or based on one newly defined MCS table, or based on one MCS table pre-configured by the network.

Similar to the above, if the transmitting end does not inform the receiving end of the MCS actually used, the receiving end needs to blindly decode the transmission of the scheduling without grant based on multiple candidate MCSs, which may have additional requirements for the base station or UE capability. For the transmission of the scheduling without grant for downlink, a new UE capability can be introduced, which refers to the maximum number of blind decoding of PDSCH based on multiple candidate MCSs supported by the UE, and the UE may report such UE capability to the base station, so that the base station can make appropriate configuration for scheduling without grant, that is, the size of MCS set configured by the base station for the UE to select may not exceed the maximum number of blind decoding of PDSCH reported by UE.

Similar to the above, the transmitting end can inform the receiving end of the actually used MCS in an explicit or implicit way, and the explicit way refers to informing the receiving end of the actually used MCS through special signaling. For example, for the transmission of the scheduling without grant for uplink, MCS information can be transmitted in a piggyback way through PUSCH of the scheduling without grant, and the UE uses part of PUSCH resources of the scheduling without grant to transmit coded and modulated MCS information according to a predefined rule, and the PUSCH of the scheduling without grant performs rate matching on these resource elements occupied by MCS information transmission. This method can also be used for the transmission of the scheduling without grant for downlink, for example, the MCS information is transmitted in a piggyback way through the PDSCH of the scheduling without grant, the base station uses part of PDSCH resources of the scheduling without grant to transmit coded and modulated MCS information according to a predefined rule, and the PDSCH of the scheduling without grant performs rate matching on these resource elements occupied by MCS information transmission.

Implicit way means that the actually used MCS is implicitly informed to the receiving end through other transmission parameters. For example, the transmitting end can imply the MCS information through the DMRS sequence used by the transmission of the scheduling without grant, that is, different MCS information corresponds to different DMRS sequences, for example, the corresponding relationship is realized by embedding MCS information in the DMRS sequence generation function; or the transmitting end may imply MCS information through the scrambling code sequence of CRC, that is, different MCS information corresponds to different CRC scrambling code sequences, for example, the corresponding relationship is realized by defining one table, in which the CRC scrambling code sequence corresponding to each MCS information is specified.

The scheduling without grant is suitable for periodic data services, which can greatly save scheduling signaling overhead and reduce scheduling delay. However, the pre-configured scheduling resources and parameters are fixed in each transmission period, which makes the pre-configured scheduling resources or parameters may not necessarily match the data packets that arrived at that time and channel conditions in a certain transmission period. Therefore, if some scheduling parameters can be adjusted dynamically in each transmission period, the transmission efficiency may be improved.

In an example, the frequency domain resource starting position and the time domain resource starting position of the scheduling without grant is fixed, i.e., pre-configured, in each transmission period, but the MCS, the number of physical resource blocks allocated in the frequency domain and/or the number of symbols/slots allocated in the time domain can be dynamically adjusted in each transmission period. As shown in the figure, in each transmission period, the transmitting end can select an appropriate MCS according to the channel quality, and decide the number of physical resource blocks in frequency domain and/or the number of symbols/slots in time domain according to the size of the arrived data packet, and transmit these dynamically adjusted parameter information to the receiving end in a piggyback way, that is, transmitting the dynamically adjusted parameter information by taking up part of resource elements of the transmission of the scheduling without grant.

Figure 11D:
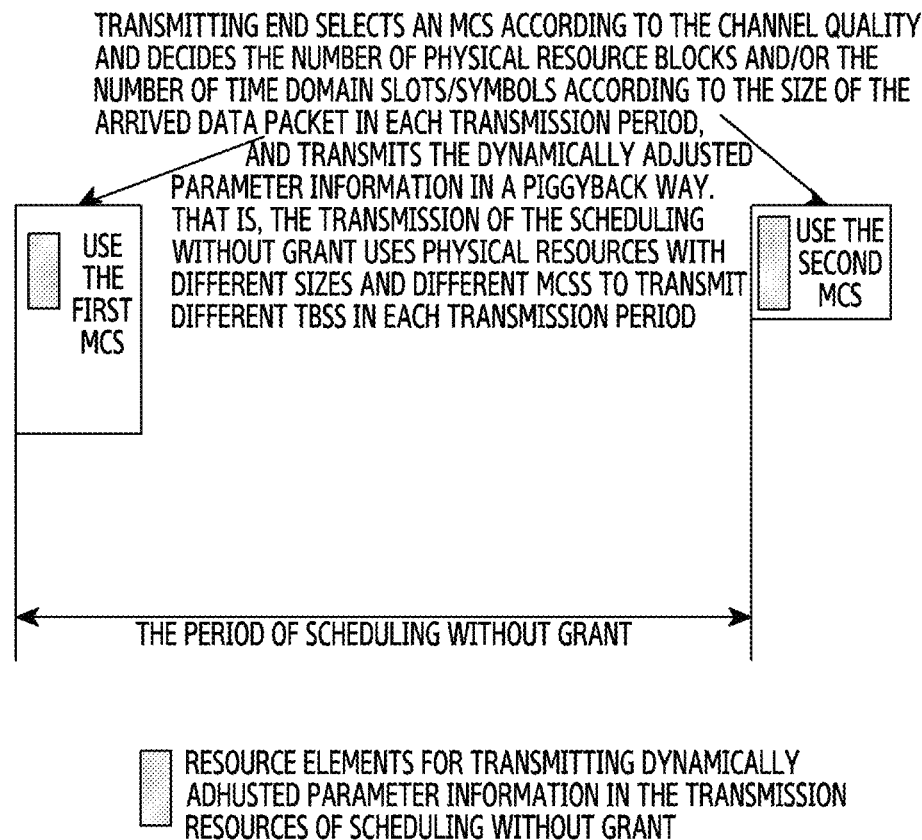
FIG. 11D illustrates that the transmitting end uses physical resources with different size and different MCSs to transmit TBSs with different sizes in each transmission period according to an embodiment of the present disclosure.

As shown in FIG. 11D, the transmitting end uses physical resources with different size and different MCS to transmit TBS with different sizes in each transmission period, and transmits the information of actually used physical resources and MCS by occupying part of resource elements of transmission of the scheduling without grant in a piggyback way.

For transmission of the scheduling without grant for downlink, the above-mentioned dynamically adjustable scheduling parameters are decided by the base station in each transmission period, and the base station informs the UE of these dynamically adjusted scheduling parameters in a piggyback way through the PDSCH of the scheduling without grant, that is, the coded and modulated scheduling parameter information is mapped on part of resources of the PDSCH of the scheduling without grant according to a predefined rule. The PDSCH of the scheduling without grant performs rate matching on these occupied resource elements. At the receiving end, the UE first receives the scheduling parameter information, and then decodes the PDSCH of the scheduling without grant based on the scheduling parameter information.

For transmission of the scheduling without grant for uplink, the above-mentioned dynamically adjustable scheduling parameters are decided by the UE in each transmission period, and the UE informs the base station of these dynamically adjusted scheduling parameters in a piggyback way through the PUSCH of the scheduling without grant, that is, the coded and modulated scheduling parameter information is mapped on part of resources of the PUSCH of the scheduling without grant according to a predefined rule. The PUSCH of the scheduling without grant performs rate matching on these occupied resource elements. At the receiving end, the base station first receives the scheduling parameter information, and then decodes the PUSCH of the scheduling without grant based on the scheduling parameter information.

In the aforementioned examples, the transmitting end dynamically adjusts the scheduling parameters based on a pre-configured or predefined set in each transmission period. For example, the transmitting end dynamically adjusts the MCS according to the channel quality in each transmission period based on an MCS set, which can be indicated in the configuration message or the activating DCI of the transmission of the scheduling without grant, or obtained according to the reference MCS indicated in the configuration message or the activating DCI of the transmission of the scheduling without grant. For example, the MCS set includes the reference MCS and the closest few MCS higher (or lower) than the reference MCS level.

And/or, the transmitting end dynamically adjusts the number of actually occupied physical resource blocks according to the size of the arrived data packet in each transmission period based on a set of scaling factors, and the transmitting end selects an appropriate scaling factor according to the size of the arrived data packet, multiplies the scaling factor by the number of physical resource blocks indicated in the configuration message or activating DCI for transmission of the scheduling without grant, and then rounds to obtain the corresponding number of physical resource blocks, and the set of scaling factors can be predefined or pre-configured. In an example, this set of scaling factors includes 1 and several decimals less than 1, that is, the number of physical resource blocks indicated in the configuration message or activating DCI for transmission of the scheduling without grant is the maximum number available; in another example, this set of scaling factors includes 1 and several integers greater than 1, that is, the number of physical resource blocks indicated in the configuration message or activating DCI for transmission of the scheduling without grant is the minimum number available.

And/or, the transmitting end dynamically adjusts the number of actually occupied symbols/slots according to the size of the arrived data packet in each transmission period based on a set of scaling factors, and selects an appropriate scaling factor according to the size of the arrived data packet, multiplies the scaling factor by the number of symbols/slots indicated in the configuration message or activating DCI for the transmission of the scheduling without grant, and then rounds to obtain the corresponding number of symbols/slots, and the set of scaling factors can be predefined or pre-configured. In an example, this set of scaling factors includes 1 and several decimals less than 1, that is, the number of symbols/slots indicated in the configuration message or DCI of the transmission of the scheduling without grant is the maximum number available; in another example, this set of scaling factors includes 1 and several integers greater than 1, that is, the number of symbols/slots indicated in the configuration message or DCI for the transmission of the scheduling without grant is the minimum number available.

Since the receiving end does not know the number of physical resource blocks in frequency domain and the number of symbols/slots in time domain actually used by the transmitting end before obtaining the indication information of these dynamically adjusted scheduling parameters, the resource elements used for piggyback transmission of these scheduling parameter information need to be limited to definite positions, for example, they may be limited to the minimum number of physical resource blocks for transmission of the scheduling without grant, and/or limited to the minimum number of symbols/slots for transmission of the scheduling without grant. The minimum number of physical resource blocks and the minimum number of symbols/slots above can be indicated by the configuration message or activating DCI of the scheduling without grant, or obtained according to the number of physical resource blocks and symbols/slots indicated in the configuration message or activating DCI of the scheduling without grant, and the minimum scaling factor, or they are predefined values.

In an example, the resource mapping for piggyback scheduling parameter information is mapped in a way of time domain first and then frequency domain. For example, the time domain mapping starts from the first symbol at the first resource element position in the lowest (or highest) frequency domain, until reaching the minimum number of available symbols/slots, then returns to the next resource element position and continues to map according to this rule.

In another example, the resource mapping for piggyback scheduling parameter information is mapped in the way of frequency domain first and then time domain. For example, the frequency domain mapping starts from the first resource element position at the first symbol in the lowest (or highest) frequency domain, until reaching the minimum number of available physical resource blocks, then goes back to the next symbol and continues to map according to this rule.

In another example, in addition to dynamically adjusting MCS, the number of physical resource blocks and the number of symbols/slots in each transmission period, the transmitting end can also dynamically adjust the starting position of frequency domain resources and/or time domain resources. The transmitting end transmits the dynamically adjusted scheduling parameter information to the receiving end on pre-configured resources in each transmission period, and the receiving end periodically receives the dynamically adjusted scheduling parameter information on pre-configured resources, and then receives corresponding data channels based on the scheduling parameter information.

This periodic scheduling method can achieve similar effect to dynamic scheduling, but it is different from dynamic scheduling. Traditional dynamic scheduling transmission is scheduled by the base station regardless of downlink or uplink, and the base station indicates scheduling information to the UE through a PDCCH. The UE monitors its own PDCCH in one or more candidate PDCCHs from the pre-configured PDCCH search space. PDCCH monitoring is only performed during the active time of discontinuous reception (DRX), and the UE does not need to monitor PDCCH during the non-active time of DRX.

While in this scheduling method, for downlink transmission, physical resources and scheduling parameters are determined by the base station in each transmission period, and the base station periodically transmits a newly defined downlink physical control channel on the pre-configured resources. The newly defined downlink physical control channel carries parameter information (similar to the existing downlink control information) for dynamic scheduling of a PDSCH. The newly defined downlink physical control channel is completely different from PDCCH with resource mapping mode based on a search space. The newly defined downlink physical control channel can adopt resource allocation mode and resource allocation granularity similar to a PDSCH, for example, the newly defined downlink physical control channel is mapped to one or more physical resource blocks, and the physical resources for transmitting this newly defined downlink physical control channel can be indicated by the configuration message or activating DCI of this scheduling method.

The UE periodically receives the newly defined downlink physical control channel on the one or more physical resource blocks, and then receives the corresponding scheduled PDSCH based on the scheduling parameter information obtained by decoding. If the UE does not receive the newly defined downlink physical control channel, the UE does not need to receive the corresponding scheduled PDSCH, and the UE needs to receive the newly defined downlink physical control channel periodically at every transmission opportunity. Even in the non-active time of DRX, the UE may wake up and receive this newly defined downlink physical control channel on the corresponding transmission opportunity, which is completely different from the existing PDCCH monitoring mechanism.

For uplink transmission, the physical resources and scheduling parameters are determined by the UE in each transmission period. The UE periodically transmits a newly defined uplink physical control channel on the pre-configured resources. The newly defined uplink physical control channel carries parameter information for dynamic scheduling of a PUSCH. The newly defined uplink physical control channel can adopt similar design, resource allocation method and resource allocation granularity to those of a PUCCH. The physical resources used for the transmission of this newly defined uplink physical control channel can be indicated by the configuration message or activating DCI of this scheduling method.

The base station receives this newly defined uplink physical control channel on the pre-configured resources, and then receives the corresponding scheduled PUSCH based on the scheduling parameter information obtained by decoding. The UE needs to periodically transmit this newly defined uplink physical control channel on every transmission opportunity, unless there is no data to be transmitted in a certain transmission period. If the UE has uplink data to be transmitted in one transmission period, even in the non-active time of DRX, the UE may wake up and transmit the newly defined uplink physical control channel and the scheduled PUSCH on the corresponding transmission opportunity.

Here, since resource allocation is determined by the UE itself, before receiving this newly defined uplink physical control channel, the base station needs to reserve all resources that the UE may use for PUSCH scheduling. After receiving this newly defined uplink physical control channel, the base station can allocate other physical resources other than the physical resources actually used by the UE to other UE. In order to enable the base station to have enough response time to allocate remaining resources to other UE after receiving this newly defined uplink physical control channel, the time interval between this newly defined uplink physical control channel and its scheduled PUSCH needs to meet a preset threshold.

In the existing system, when the UE is in the non-active time of a DRX period, the UE still needs to wake up from the dormant period to receive the downlink PDSCH of the scheduling without grant, and the UE needs to perform time-frequency synchronization after waking up, so as to prepare for the reception of a PDSCH, which needs to consume UE power. This frequent sleep/wake-up behavior may seriously increase the power consumption of the UE, especially when the transmission period of the scheduling without grant is small. If the base station does not transmit PDSCH at a certain transmission opportunity, the UE may wake up in vain and waste power. If the UE is indicated through wake-up signaling as to whether to receive a PDSCH of the scheduling without grant, the power consumption of the UE can be effectively reduced.

In an example, the PDSCH of the scheduling without grant in one or more transmission periods corresponds to one wake-up signaling, and the wake-up signaling is used to indicate whether the UE needs to receive the PDSCH of the scheduling without grant in the corresponding one or more transmission periods. The UE needs to periodically monitor the wake-up signaling of the PDSCH of the scheduling without grant. If the wake-up signaling indicates that the UE receives the corresponding PDSCH of the scheduling without grant, the UE needs to receive the corresponding PDSCH of the scheduling without grant; otherwise, the UE does not need to receive the corresponding PDSCH of the scheduling without grant.

In an example, the wake-up signaling is only used for transmission of the scheduling without grant for downlink during DRX non-active time, that is, when the UE is in DRX non-active time, the UE needs to monitor the wake-up signaling corresponding to the PDSCH of the scheduling without grant, and decide whether to receive the PDSCH of the scheduling without grant according to the monitoring result of the wake-up signaling; while when the UE is in DRX active time, the UE does not need to monitor the wake-up signaling corresponding to the PDSCH of the scheduling without grant and needs to receive the PDSCH of the scheduling without grant in each transmission period.

The wake-up signaling can be carried by a physical signal sequence or DCI. When the wake-up signaling is carried by a physical signal sequence, whether the wake-up signaling is received by the UE may implicitly indicate whether the UE needs to receive the corresponding PDSCH of the scheduling without grant. For example, if the wake-up signaling is received by the UE, the UE needs to receive the corresponding PDSCH of the scheduling without grant, and if the wake-up signaling is not received by the UE, the UE does not need to receive the corresponding PDSCH of the scheduling without grant. When the wake-up signaling is carried by DCI, for example, a 1-bit indication field may be used, where bit 1 indicates that the UE needs to receive the corresponding PDSCH of the scheduling without grant, and bit 0 indicates that the UE does not need to receive the corresponding PDSCH of the scheduling without grant.

In an example, the wake-up signaling is carried by a physical signal sequence, and the time-frequency domain position of the wake-up signaling is pre-configured, wherein the time-domain position can be configured by an interval relative to the corresponding PDSCH of the scheduling without grant. For example, the wake-up signaling is transmitted at a pre-configured interval before the corresponding PDSCH of the scheduling without grant, that is, the time-domain position of the wake-up signaling is determined according to the time-domain position of the corresponding PDSCH of the scheduling without grant and the pre-configured interval.

In an example, the wake-up signaling is carried by DCI, and the DCI including the wake-up signaling indication field may be DCI for PDSCH scheduling, DCI for PUSCH scheduling, and/or DCI for other purposes.

In addition, the wake-up signaling can also be transmitted together with some dynamically adjusted scheduling parameters of the PDSCH of the scheduling without grant, that is, the information of some dynamically adjusted scheduling parameters is further interpreted only when the wake-up signaling indicates that the UE needs to receive the PDSCH of the scheduling without grant. For example, the wake-up signaling can be transmitted together with the TBS, the MCS, the number of physical resource blocks and/or the number of symbols/slots of the PDSCH of the scheduling without grant, for example, the information is transmitted by time division multiplexing, frequency division multiplexing and/or code division multiplexing among multiple physical signal sequences, or through one or more indication fields contained in DCI.

Please refer to FIG. 12, which illustrates a flowchart of a method performed by a base station according to an embodiment of the present disclosure. The method may include step S510.

In one example of S510, the base station configures configuration information of scheduling without grant for uplink or downlink for the user equipment.

Herein, the configuration information of the scheduling without grant includes first information and/or second information, wherein the first information is used for indicating to support the scheduling without grant for transmissions with multiple different transport block sizes, and the second information is used for indicating to support the scheduling without grant for transmissions with multiple different starting time domain positions within one transmission period.

The method can effectively reduce the number of payload bits, improve the transmission efficiency and effectively reduce the transmission delay.

It can be understood that, before step S510, it may also include: the base station determines configuration information of scheduling without grant for uplink or downlink.

It can be understood that the above-mentioned method performed by the base station is a method at the base station side corresponding to the above-mentioned method performed by the user equipment, and one can refer to the description corresponding to the above-mentioned method performed by the user equipment for its specific example details and make reasonable derivation and replacement, which will not be repeated here.

Figure 13:
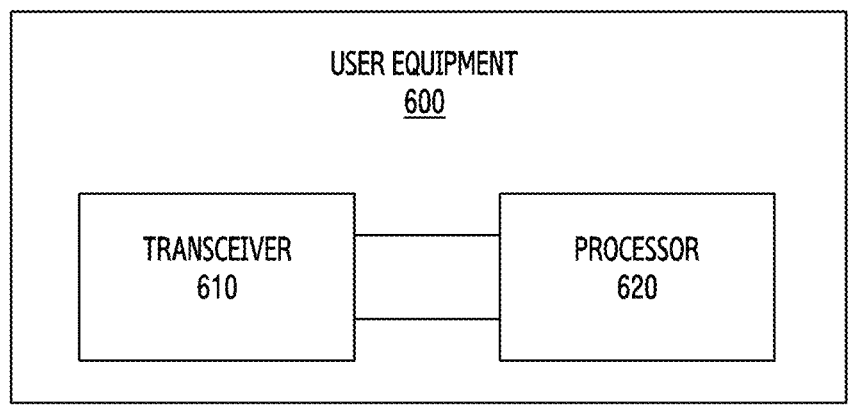
FIG. 13 is a block diagram illustrating the structure of user equipment according to an embodiment of the present disclosure.

FIG. 13 is a block diagram illustrating the structure of user equipment 600 according to an embodiment of the present disclosure.

Referring to FIG. 13, the user equipment 600 includes a transceiver 610 and a processor 620. The transceiver 610 is configured to transmit and receive signals to and from the outside. The processor 620 is configured to perform any of the above method performed by the user equipment. The user equipment 600 can be implemented in the form of hardware, software or a combination of hardware and software, so that the processor 620 can perform the method performed by the user equipment described in the present disclosure.

Figure 14:
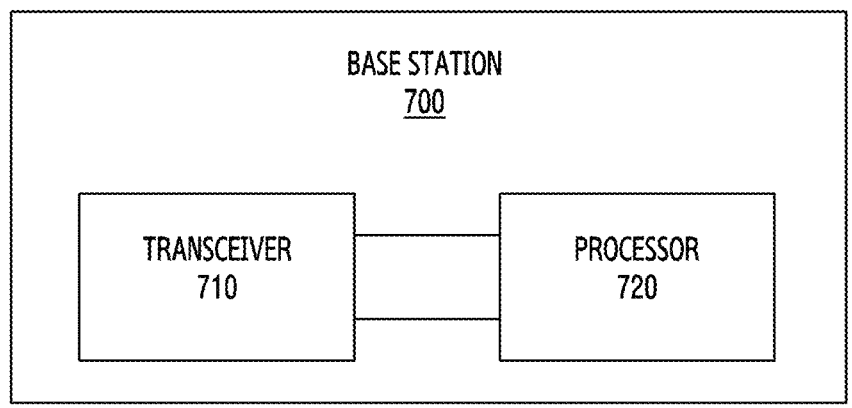
FIG. 14 is a block diagram illustrating the structure of a base station according to an embodiment of the present disclosure.

FIG. 14 is a block diagram showing the structure of a base station 700 according to an embodiment of the present disclosure.

Referring to FIG. 14, a base station 700 includes a transceiver 710 and a processor 720. The transceiver 710 is configured to transmit and receive signals to and from the outside. The processor 720 is configured to perform any of the above method performed by the base station. The base station 700 can be implemented in the form of hardware, software or a combination of hardware and software, so that the processor 720 can perform the method performed by the user terminal described in the present disclosure.

At least one embodiment of the present disclosure also provides a non-transitory computer-readable recording medium having stored thereon a program, which when performed by a computer, performs the methods described above.

According to an aspect of the present disclosure, there is provided a method performed by user equipment, comprising: receiving configuration information of scheduling without grant for uplink or downlink; performing transmission of the scheduling without grant based on the configuration information of the scheduling without grant, wherein the configuration information of scheduling without grant includes first information and/or second information, wherein the first information is used for indicating related information of multiple different transport block sizes and the second information is used for indicating related information of multiple different starting time domain positions.

According to the method performed by user equipment provided by the present disclosure, wherein the receiving configuration information of scheduling without grant for uplink or downlink, comprises: receiving a radio resource control (RRC) message for configuring the scheduling without grant, the RRC message including the configuration information of the scheduling without grant; or receiving downlink control information DCI for activating configuration of the scheduling without grant, the DCI including the configuration information of the scheduling without grant.

According to the method performed by the user equipment provided by the present disclosure, wherein the first information includes at least one of the following: related information of multiple different transport block sizes; at least one of the following information: respective ratio information of each transport block size relative to a reference transport block size; or respective ratio information of a number of time domain resources corresponding to each transport block size relative to a number of time domain resources corresponding to the reference transport block size; or respective ratio information of a size of frequency domain resources corresponding to each transport block size relative to a size of frequency domain resources corresponding to the reference transport block size; or respective ratio information of transmission power corresponding to each transport block size relative to transmission power corresponding to the reference transport block size.

According to the method performed by the user equipment provided by the present disclosure, wherein the reference transport block size is a predefined one of the multiple transport block sizes, the time domain resources and frequency domain resources corresponding to the reference transport block size are indicated through scheduling information without grant, and the reference transport block size is determined based on the scheduling information without grant.

According to the method performed by user equipment provided by the present disclosure, the method further comprises: calculating at least one of the time domain resources, the frequency domain resources or the transmission power corresponding to each transport block size by at least one of the following methods: respectively calculating the number of time domain resources corresponding to each transport block size based on the number of time domain resources corresponding to the reference transport block size, the reference transport block size and each transport block size; or respectively calculating the size of the frequency domain resources corresponding to each transport block size based on the size of the frequency domain resources corresponding to the reference transport block size, the reference transport block size and each transport block size; or respectively calculating the transmission power corresponding to each transport block size based on the transmission power corresponding to the reference transport block size, the reference transport block size and each transport block size; or respectively calculating the number of time domain resources corresponding to each transport block size based on the number of time domain resources corresponding to the reference transport block size and respective ratio information of the number of time domain resources corresponding to each transport block size relative to the number of time domain resources corresponding to the reference transport block size; or respectively calculating the size of frequency domain resources corresponding to each transport block size based on the size of frequency domain resources corresponding to the reference transport block size and respective ratio information of the size of frequency domain resources corresponding to each transport block size relative to the size of frequency domain resources corresponding to the reference transport block size; or respectively calculating the transmission power corresponding to each transport block size based on the transmission power corresponding to the reference transport block size and respective ratio information of the transmission power corresponding to each transport block size relative to the transmission power corresponding to the reference transport block size.

According to the method performed by the user equipment provided by the present disclosure, wherein different transport block sizes correspond to different numbers of time domain symbols; different transport block sizes correspond to different numbers of slots; different transport block sizes correspond to different numbers of repetitions; different transport block sizes correspond to different numbers of physical resource blocks (PRBs); or different transport block sizes correspond to different numbers of resource block groups (RBGs).

According to the method performed by the user equipment provided by the present disclosure, wherein the performing transmission of the scheduling without grant, comprises: for transmission of the scheduling without grant for uplink, selecting one transport block size from among the multiple different transport block sizes to transmit a physical uplink shared channel PUSCH of the scheduling without grant, and/or selecting one initial time domain location from among the multiple different initial time domain locations to transmit the PUSCH of the scheduling without grant; for transmission of the scheduling without grant for downlink, blindly decoding a physical downlink shared channel PDSCH of the scheduling without grant in the multiple different transport block sizes, and/or blindly decoding the PDSCH of the scheduling without grant in the multiple different starting time domain positions.

According to the method performed by the user equipment provided by the present disclosure, the method further comprises: reporting the transport block size used by the PUSCH of the scheduling without grant or obtaining the transport block size used by the PUSCH of the scheduling without grant by at least one of the following ways: transmitting information of the transport block size used by the PUSCH on the first one or more symbols of the resources corresponding to the PUSCH; or implicitly indicating the transport block size used by the PUSCH through a demodulation reference signal (DMRS) sequence or a cyclic redundancy check (CRC) scrambling code sequence used by the PUSCH; or receiving indication information of the transport block size used by the PDSCH on the first one or more symbols of the resources corresponding to the PDSCH; or obtaining the transport block size used by the PDSCH through a demodulation reference signal (DMRS) sequence or a cyclic redundancy check (CRC) scrambling code sequence used by the PDSCH.

According to the method performed by the user equipment provided by the present disclosure, wherein transmission of the scheduling without grant for an initial transmission supports multiple different transport block sizes, and transmission based on dynamic scheduling for corresponding retransmission only supports one transport block size, wherein a transport block size used for the retransmission is a transport block size selected and used by the transmission of the scheduling without grant among multiple different transport block sizes; or the transmission of the scheduling without grant for the initial transmission and the transmission based on dynamic scheduling for the corresponding retransmission both support multiple different transport block sizes.

According to the method performed by the user equipment provided by the present disclosure, the method further comprises: transmitting information for indicating capability of the user equipment to a base station, wherein the information for indicating the capability of the user equipment comprises at least one of the following: information for indicating a maximum number of physical downlink shared channels (PDSCHs) that the user equipment can decode; information for indicating whether the user equipment supports transmissions of the scheduling without grant with multiple different transport block sizes; information for indicating whether the user equipment supports transmissions of the scheduling without grant with multiple different starting time domain positions; or information for indicating whether the user equipment supports transmissions of the scheduling without grant with multiple different transmission sizes and multiple different starting time domain positions at the same time.

According to the method performed by the user equipment provided by the present disclosure, wherein the second information includes at least one of the following: related information of intervals of the multiple different starting time domain positions relative to the first starting time domain position in the multiple different starting time domain positions; related information of intervals of the multiple different starting time domain positions relative to respective previous starting time domain positions; related information of a number of different starting time domain positions; or related information of time domain windows where different starting time domain positions are located.

According to the method performed by the user equipment provided by the present disclosure, wherein transmissions at the multiple different starting time domain positions correspond to same frequency domain resources, and correspond to partially overlapping or non-overlapping time domain resources.

According to an aspect of the present disclosure, there is provided a method performed by a base station, comprising: transmitting configuration information of scheduling without grant for uplink or downlink by the base station to user equipment, wherein the configuration information of the scheduling without grant includes first information and/or second information, wherein the first information is used for indicating related information of multiple different transport block sizes and the second information is used for indicating related information of multiple different starting time domain positions.

According to an aspect of the present disclosure, there is provided user equipment, the user equipment comprises: a transceiver configured to transmit and receive signals with the outside; and a processor configured to control the transceiver to perform a method according to the method performed by the user equipment.

According to another aspect of the present disclosure, there is provided a base station comprising a transceiver configured to transmit and receive signals with the outside; and a processor configured to control the transceiver to perform the above methods performed by the base station.

Although the present disclosure has been described with various embodiments, various changes and modifications may be suggested to one skilled in the art. It is intended that the present disclosure encompass such changes and modifications as fall within the scope of the appended claims

What is claimed is:

1. A method performed by user equipment, the method comprising:
receiving configuration information of scheduling without a grant for an uplink transmission or a downlink reception,
wherein the configuration information of the scheduling without the grant includes first information and second information,
wherein the first information is used for indicating multiple different transport block sizes and the second information is used for indicating multiple different starting time domain positions which are associated with each of the multiple different transport block sizes, respectively, and
wherein the first information includes respective ratio information of each transport block size associated with a reference transport block size; and
performing the uplink transmission based on the respective ratio information of each of the transport block sizes associated with the reference transport block size and the multiple different starting time domain positions which are associated with each of the multiple different transport block sizes.

2. The method according to claim 1, further comprising:
receiving a radio resource control (RRC) message for configuring the scheduling without the grant, the RRC message including the configuration information of the scheduling without the grant; or
receiving downlink control information (DCI) for configuring the scheduling without the grant, the DCI including the configuration information of the scheduling without the grant.

3. The method according to claim 1, wherein the first information further includes at least one of:
information of multiple different transport block sizes;
respective ratio information of a number of time domain resources corresponding to each transport block size associated with a number of time domain resources corresponding to the reference transport block size;
respective ratio information of a size of frequency domain resources corresponding to each transport block size associated with a size of frequency domain resources corresponding to the reference transport block size; or
respective ratio information of transmission power corresponding to each transport block size associated with transmission power corresponding to the reference transport block size.

4. The method according to claim 3, wherein:
the reference transport block size is a predefined as one of multiple transport block sizes;
the time domain resources and frequency domain resources corresponding to the reference transport block size are indicated through scheduling information without the grant; and
the reference transport block size is determined based on the scheduling information without the grant.

5. The method according to claim 4, further comprising:
calculating at least one of the time domain resources, the frequency domain resources, or the transmission power corresponding to each transport block size by at least one of:
respectively calculating the number of time domain resources corresponding to each transport block size based on the number of time domain resources corresponding to the reference transport block size, the reference transport block size and each transport block size;
respectively calculating the size of the frequency domain resources corresponding to each transport block size based on the size of the frequency domain resources corresponding to the reference transport block size, the reference transport block size and each transport block size;
respectively calculating the transmission power corresponding to each transport block size based on the transmission power corresponding to the reference transport block size, the reference transport block size and each transport block size;
respectively calculating the number of time domain resources corresponding to each transport block size based on the number of time domain resources corresponding to the reference transport block size and respective ratio information of the number of time domain resources corresponding to each transport block size associated with the number of time domain resources corresponding to the reference transport block size;
respectively calculating the size of frequency domain resources corresponding to each transport block size based on the size of frequency domain resources corresponding to the reference transport block size and respective ratio information of the size of frequency domain resources corresponding to each transport block size associated with the size of frequency domain resources corresponding to the reference transport block size; or
respectively calculating the transmission power corresponding to each transport block size based on the transmission power corresponding to the reference transport block size and respective ratio information of the transmission power corresponding to each transport block size associated with the transmission power corresponding to the reference transport block size.

6. The method according to claim 5, wherein, different transport block sizes correspond to different numbers of time domain symbols, respectively;
different transport block sizes correspond to different numbers of slots, respectively;
different transport block sizes correspond to different numbers of repetitions, respectively;
different transport block sizes correspond to different numbers of physical resource blocks (PRBs), respectively; or
different transport block sizes correspond to different numbers of resource block groups (RBGs), respectively.

7. The method according to claim 5, further comprising:
for the scheduling without the grant for the uplink transmission, selecting at least one of a transport block size from among the multiple different transport block sizes to transmit a physical uplink shared channel (PUSCH) of the scheduling without the grant or one initial time domain location from among multiple different initial time domain locations to transmit the PUSCH of the scheduling without the grant; or
for the scheduling without the grant for the downlink reception, blindly decoding at least one of a physical downlink shared channel (PDSCH) of the scheduling without the grant in the multiple different transport block sizes or the PDSCH of the scheduling without the grant in the multiple different starting time domain positions.

8. The method according to claim 7, further comprising:
reporting the transport block size used by the PUSCH of the scheduling without the grant or obtaining the transport block size used by the PDSCH of the scheduling without the grant by at least one of:
transmitting information of the transport block size used by the PUSCH on one or more symbols of resources corresponding to the PUSCH;
implicitly indicating the transport block size used by the PUSCH through a demodulation reference signal (DMRS) sequence or a cyclic redundancy check (CRC) scrambling code sequence used by the PUSCH;
receiving indication information of the transport block size used by the PDSCH on one or more symbols of the resources corresponding to the PDSCH; or
obtaining the transport block size used by the PDSCH through the DMRS sequence or the CRC scrambling code sequence used by the PDSCH.

9. The method according to claim 5, wherein:
a transmission of the scheduling without the grant for an initial transmission supports multiple different transport block sizes and a transmission based on a dynamic scheduling for corresponding retransmission supports a transport block size; and
the transport block size used for the corresponding retransmission is a transport block size selected and used by the transmission of the scheduling without the grant among multiple different transport block sizes; or
the transmission of the scheduling without the grant for the initial transmission and the transmission based on the dynamic scheduling for the corresponding retransmission both support the multiple different transport block sizes.

10. The method according to claim 5, further comprising:
transmitting, to a base station, information for indicating capability of the user equipment, wherein the information for indicating the capability of the user equipment comprises at least one of:
information for indicating a maximum number of physical downlink shared channels (PDSCHs) that the user equipment decodes;
information for indicating whether the user equipment supports transmissions of the scheduling without the grant with the multiple different transport block sizes;
information for indicating whether the user equipment supports transmissions of the scheduling without the grant with the multiple different starting time domain positions; or
information for indicating whether the user equipment supports transmissions of the scheduling without the grant with both multiple different transmission sizes and the multiple different starting time domain positions.

11. The method according to claim 5, wherein the second information includes at least one of:
information of intervals of the multiple different starting time domain positions associated with a first starting time domain position in the multiple different starting time domain positions;
information of intervals of the multiple different starting time domain positions associated with respective previous starting time domain positions;
information of a number of different starting time domain positions; or
information of time domain windows where different starting time domain positions are located.

12. The method according to claim 5, wherein transmissions at the multiple different starting time domain positions correspond to same frequency domain resources and partially overlapping or non-overlapping time domain resources.

13. A method performed by a base station, the method comprising:
transmitting, to a user equipment, configuration information of scheduling without a grant for an uplink reception or a downlink transmission,
wherein the configuration information of the scheduling without the grant includes first information and second information,
wherein the first information is used for indicating multiple different transport block sizes and the second information is used for indicating multiple different starting time domain positions which are associated with each of the multiple different transport block sizes, respectively, and
wherein the first information includes respective ratio information of each transport block size associated with a reference transport block size; and
performing the uplink reception based on the respective ratio information of each of the transport block sizes associated with the reference transport block size and the multiple different starting time domain positions which are associated with each of the multiple different transport block sizes.

14. A user equipment, the user equipment comprising:
a transceiver configured to receive configuration information of scheduling without a grant for an uplink transmission or a downlink reception,
wherein the configuration information of the scheduling without the grant includes first information and second information,
wherein the first information is used for indicating multiple different transport block sizes and the second information is used for indicating multiple different starting time domain positions which are associated with each of the multiple different transport block sizes, respectively, and
wherein the first information includes respective ratio information of each transport block size associated with a reference transport block size; and
a processor operably coupled to the transceiver, the processor configured to perform the uplink transmission based on the respective ratio information of each of the transport block sizes associated with the reference transport block size and the multiple different starting time domain positions which are associated with each of the multiple different transport block sizes.

15. The user equipment according to claim 14, wherein the transceiver is further configured to:
receive a radio resource control (RRC) message for configuring the scheduling without the grant, the RRC message including the configuration information of the scheduling without the grant; or
receive downlink control information (DCI) for configuring the scheduling without the grant, the DCI including the configuration information of the scheduling without the grant.

16. The user equipment according to claim 14, wherein the first information further includes at least one of:
information of multiple different transport block sizes;
respective ratio information of a number of time domain resources corresponding to each transport block size associated with a number of time domain resources corresponding to the reference transport block size;
respective ratio information of a size of frequency domain resources corresponding to each transport block size associated with a size of frequency domain resources corresponding to the reference transport block size; or
respective ratio information of transmission power corresponding to each transport block size associated with transmission power corresponding to the reference transport block size.

17. The user equipment according to claim 16, wherein:
the reference transport block size is a predefined as one of multiple transport block sizes;
the time domain resources and frequency domain resources corresponding to the reference transport block size are indicated through scheduling information without the grant; and
the reference transport block size is determined based on the scheduling information without the grant.

18. The user equipment according to claim 17, wherein the processor is further configured to:
calculate at least one of the time domain resources, the frequency domain resources, or the transmission power corresponding to each transport block size by at least one of:
respectively calculating the number of time domain resources corresponding to each transport block size based on the number of time domain resources corresponding to the reference transport block size, the reference transport block size and each transport block size;
respectively calculating the size of the frequency domain resources corresponding to each transport block size based on the size of the frequency domain resources corresponding to the reference transport block size, the reference transport block size and each transport block size;
respectively calculating the transmission power corresponding to each transport block size based on the transmission power corresponding to the reference transport block size, the reference transport block size and each transport block size;
respectively calculating the number of time domain resources corresponding to each transport block size based on the number of time domain resources corresponding to the reference transport block size and respective ratio information of the number of time domain resources corresponding to each transport block size associated with the number of time domain resources corresponding to the reference transport block size;
respectively calculating the size of frequency domain resources corresponding to each transport block size based on the size of frequency domain resources corresponding to the reference transport block size and respective ratio information of the size of frequency domain resources corresponding to each transport block size associated with the size of frequency domain resources corresponding to the reference transport block size; or
respectively calculating the transmission power corresponding to each transport block size based on the transmission power corresponding to the reference transport block size and respective ratio information of the transmission power corresponding to each transport block size associated with the transmission power corresponding to the reference transport block size.

19. The user equipment according to claim 15, wherein, different transport block sizes correspond to different numbers of time domain symbols, respectively;
different transport block sizes correspond to different numbers of slots, respectively;
different transport block sizes correspond to different numbers of repetitions, respectively;
different transport block sizes correspond to different numbers of physical resource blocks (PRBs), respectively; or
different transport block sizes correspond to different numbers of resource block groups (RBGs), respectively.

20. A base station, the base station comprising:
a processor; and
a transceiver operably coupled to the processor, the transceiver configured to transmit, to a user equipment, configuration information of scheduling without a grant for an uplink reception or a downlink transmission,
wherein the configuration information of the scheduling without the grant includes first information and second information,
wherein the first information is used for indicating multiple different transport block sizes and the second information is used for indicating multiple different starting time domain positions which are associated with each of the multiple different transport block sizes, respectively, and
wherein the first information includes respective ratio information of each transport block size associated with a reference transport block size; and
a processor operably coupled to the transceiver, the processor configured to perform the uplink reception based on the respective ratio information of each of the transport block sizes associated with the reference transport block size and the multiple different starting time domain positions which are associated with each of the multiple different transport block sizes.

* * * * *